US009699708B2

(12) United States Patent
Alexander et al.

(10) Patent No.: US 9,699,708 B2
(45) Date of Patent: Jul. 4, 2017

(54) DYNAMICALLY-SELECTABLE MULTI-MODAL MODULATION IN WIRELESS MULTIHOP NETWORKS

(71) Applicant: Cooper Technologies Company, Houston, TX (US)

(72) Inventors: Roger K. Alexander, Rockville, MD (US); Jianming Yuan, Boyds, MD (US); Tzeta Tsao, Boyds, MD (US); Sergey Sukhobok, Rockville, MD (US)

(73) Assignee: Cooper Technologies Company, Houston, TX (US)

( * ) Notice: Subject to any disclaimer, the term of this patent is extended or adjusted under 35 U.S.C. 154(b) by 133 days.

(21) Appl. No.: 14/158,043

(22) Filed: Jan. 17, 2014

(65) Prior Publication Data

US 2015/0208320 A1    Jul. 23, 2015

(51) Int. Cl.
*H04W 40/24*    (2009.01)
*H04W 40/02*    (2009.01)
(Continued)

(52) U.S. Cl.
CPC ......... *H04W 40/246* (2013.01); *H04W 4/008* (2013.01); *H04W 40/02* (2013.01);
(Continued)

(58) Field of Classification Search
CPC . H04W 40/246; H04W 40/244; H04W 4/008; H04W 88/16; H04W 84/18;
(Continued)

(56) References Cited

U.S. PATENT DOCUMENTS 5,661,750 A    8/1997 Fulton
6,223,053 B1    4/2001 Friedmann et al.
(Continued)

FOREIGN PATENT DOCUMENTS

CA    2644635 A1    8/2008
CA    2812037 A1    3/2012
(Continued)

OTHER PUBLICATIONS

Sheu et al., "A Clock Synchronization Algorithm for Multihop Wireless Ad Hoc Networks," Wireless Personal Communications, (2007), 43:185-200, 16 pages.
(Continued)

*Primary Examiner* — Joshua Kading
(74) *Attorney, Agent, or Firm* — Patterson Thuente Pedersen, P.A.

(57) ABSTRACT

In a self-organizing wireless multihop network, each node device selects operation among short-range (SR) and long-range (LR) communication modes, among which the SR mode uses a higher data rate than the LR mode. Each node device advertises connectivity link availability for neighboring node devices, and selectively initiates a link in response to connectivity availability advertised by at least one neighboring node device. The availability advertising is performed in the SR and the LR communication modes, according to a periodicity that is dynamically-variable in response to prevailing circumstances in the local neighborhood. The link initiation is selectively performed in one of either the SR or the LR communication mode based on selection criteria that include data throughput performance associated with different neighboring node devices with which connectivity is available via a certain communication mode.

37 Claims, 23 Drawing Sheets

(51) Int. Cl.
*H04W 48/12* (2009.01)
*H04W 40/26* (2009.01)
*H04W 4/00* (2009.01)
*H04W 84/22* (2009.01)
*H04W 84/18* (2009.01)
*H04W 88/16* (2009.01)

(52) U.S. Cl.
CPC ......... *H04W 40/244* (2013.01); *H04W 40/26* (2013.01); *H04W 48/12* (2013.01); *H04W 84/18* (2013.01); *H04W 84/22* (2013.01); *H04W 88/16* (2013.01)

(58) Field of Classification Search
CPC ..... H04W 40/02; H04W 40/26; H04W 48/12; H04W 84/22; H04B 1/005–1/0092; H04B 1/401; H04B 7/2612; H04B 17/15; H04B 17/29; H04B 17/309; H04B 17/382
See application file for complete search history.

(56) References Cited

U.S. PATENT DOCUMENTS

| | | |
|---|---|---|
| 6,295,461 B1 | 9/2001 | Palmer et al. |
| 6,542,536 B1 | 4/2003 | Hershey et al. |
| 6,865,216 B1 | 3/2005 | Beamish et al. |
| 7,272,132 B2 | 9/2007 | Kim et al. |
| 7,328,037 B2 | 2/2008 | Tsien et al. |
| 8,018,912 B2 | 9/2011 | Habetha |
| 8,089,939 B1 | 1/2012 | Mater et al. |
| 8,208,973 B2 | 6/2012 | Mehta |
| 8,355,866 B2 | 1/2013 | Smith et al. |
| 8,385,244 B2 | 2/2013 | Hole |
| 2003/0120826 A1* | 6/2003 | Shay ................ G08G 1/096716 719/316 |
| 2004/0028060 A1 | 2/2004 | Kang |
| 2005/0248456 A1* | 11/2005 | Britton, Jr. ............. G06Q 10/08 340/539.29 |
| 2007/0010248 A1* | 1/2007 | Dravida ................ H04W 60/00 455/435.1 |
| 2007/0105558 A1 | 5/2007 | Suh et al. |
| 2010/0316043 A1 | 12/2010 | Doi et al. |
| 2010/0317374 A1 | 12/2010 | Alpert et al. |
| 2011/0111700 A1 | 5/2011 | Hackett |
| 2012/0275361 A1 | 11/2012 | Berenberg et al. |
| 2013/0083722 A1* | 4/2013 | Bhargava ............ H04W 72/085 370/315 |

FOREIGN PATENT DOCUMENTS

| | | |
|---|---|---|
| CA | 2574065 C | 3/2013 |
| CA | 2626790 C | 5/2013 |
| EP | 1367846 A1 | 12/2003 |
| EP | 1261142 B1 | 7/2008 |
| EP | 2381586 A1 | 10/2011 |
| EP | 1736010 B1 | 9/2013 |
| WO | WO 0122662 A1 * | 3/2001 ........... H04W 48/18 |
| WO | WO 2012/176951 A1 | 12/2012 |
| WO | WO 2013/028629 A2 | 2/2013 |

OTHER PUBLICATIONS

Ahmad et al, "A Survey of Low Duty Cycle MAC Protocols in Wireless Sensor Networks," Emerging Communications for Wireless Sensor Networks, Feb. 2011, 23 pages.

Semtech Wireless & Sensing Datasheet, SX1272/73—860 MHz to 1020 MHz Low Power Long Range Transceiver, Semtech Corporation, Jun. 2013, 127 pages.

Suwansantisuk et al., "Frame Synchronization for Variable-Length Packets," IEEE Journal on Selected Areas in Communications, vol. 26, No. 1, Jan. 2008, 18 pages.

De Couto et al., "A High-Throughput Path Metric for Multi-Hop Wireless Routing," Wireless Networks 11.4 (2005), 13 pages.

PCT Appln No. PCT/US2015-011902, filed Jan. 19, 2015, Search Report & Written Opinion dated Apr. 13, 2015, 7 pages.

* cited by examiner

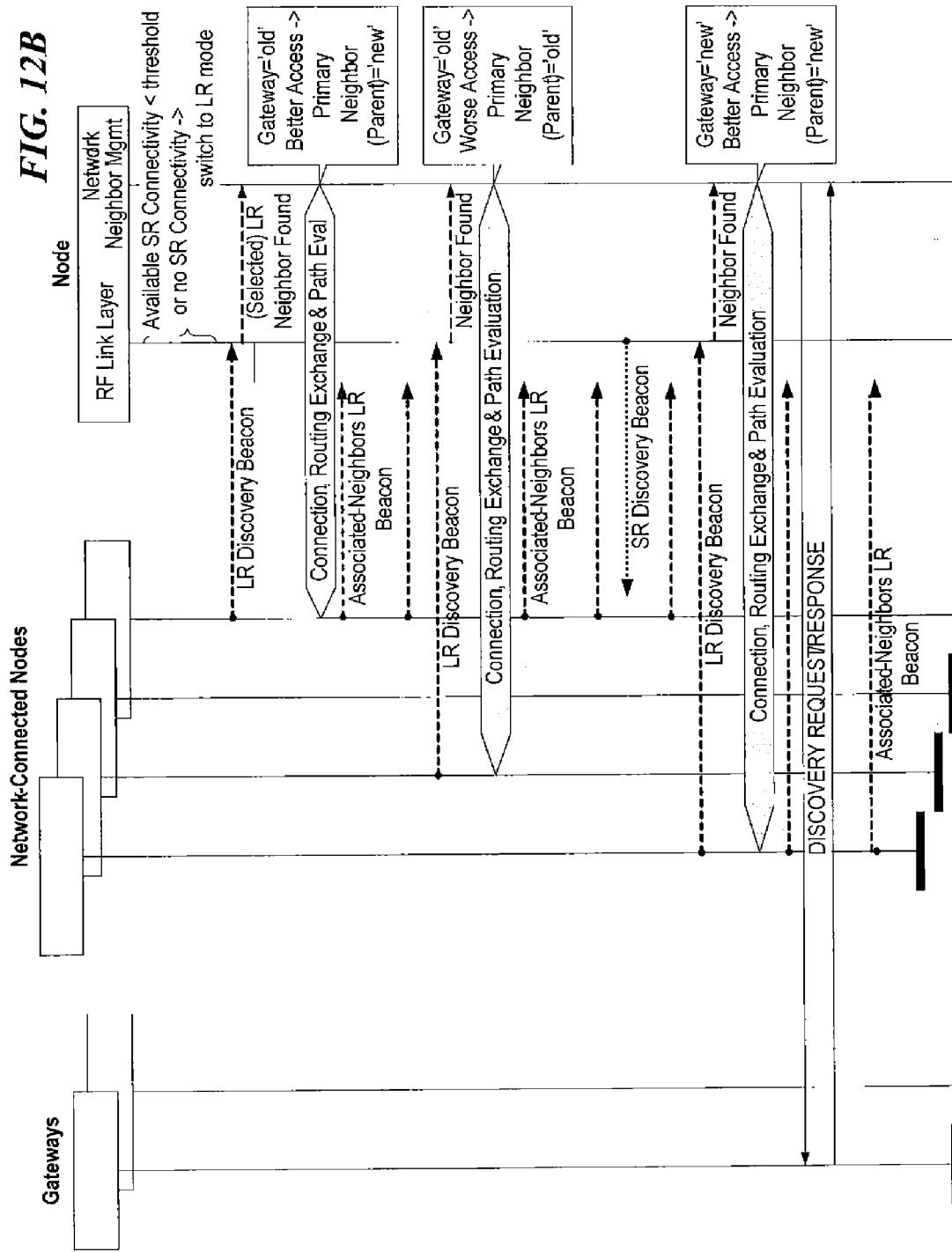

| Channel BW (kHz) | Spreading Factor, SF | Data Rate (kb/s) | Single-Slot (Control Msg or Data) | | Dual-Slot (Control Msg or Data) | | Quad-Slot (Control Msg or Data) | |
|---|---|---|---|---|---|---|---|---|
| | | | Slot Size (ms) | Burst Length* (bytes) | Slot Size (ms) | Burst Length* (bytes) | Slot Size (ms) | Burst Length* (bytes) |
| 500 | 6 | 37.5 | 5 | 12 | 10 | 32 | 20 | 80 |
| | 7 | 21.9 | 10 | 12 | 20 | 36 | 40 | 92 |
| | 8 | 12.5 | 20 | 14 | 40 | 42 | 80 | 106 |
| | 9 | 7.0 | 40 | 16 | 80 | 48 | 160 | 120 |
| | 10 | 3.9 | 80 | 18 | 160 | 54 | 320 | 134 |
| | 11 | 2.2 | 160 | 22 | 320 | 60 | 640 | 148 |
| | 12 | 1.2 | 320 | 24 | 640 | 66 | 1280 | 162 |
| 250 | 6 | 18.7 | 10 | 12 | 20 | 32 | 40 | 80 |
| | 7 | 10.9 | 20 | 12 | 40 | 36 | 80 | 92 |
| | 8 | 6.2 | 40 | 14 | 80 | 42 | 160 | 106 |
| | 9 | 3.5 | 80 | 16 | 160 | 48 | 320 | 120 |
| | 10 | 2.0 | 160 | 18 | 320 | 54 | 640 | 134 |
| | 11 | 1.1 | 320 | 22 | 640 | 60 | 1280 | 148 |
| | 12 | 0.6 | 640 | 24 | 1280 | 66 | 2560 | 162 |
| 125 | 6 | 9.3 | 20 | 12 | 40 | 32 | 80 | 80 |
| | 7 | 5.5 | 40 | 12 | 80 | 36 | 160 | 92 |
| | 8 | 3.1 | 80 | 14 | 160 | 42 | 320 | 106 |
| | 9 | 1.7 | 160 | 16 | 320 | 48 | 640 | 120 |
| | 10 | 1.0 | 320 | 18 | 640 | 54 | 1280 | 134 |
| | 11 | 0.6 | 640 | 22 | 1280 | 60 | 2560 | 148 |
| | 12 | 0.3 | 1280 | 24 | 2560 | 66 | 5120 | 162 |

*FIG. 13*

DYNAMICALLY-SELECTABLE MULTI-MODAL MODULATION IN WIRELESS MULTIHOP NETWORKS

FIELD OF THE INVENTION

The invention relates generally to data communications via wireless multihop networks and, more particularly, to asynchronous multi-modal communications in self-organizing and self-adapting networks.

BACKGROUND OF THE INVENTION

A wireless multihop communications network, such as a mesh network, includes a set of node devices capable of exchanging messages with one another over a wireless medium, typically using radio frequency (RF) communications. Each of the node devices can be primarily a communications device or, alternatively, the communications functionality may be secondary to its primary function. For example, in a given node, the communications circuitry can be a part of a device such as a computer system, a smart appliance, a vehicle, a media device, a piece of industrial equipment (e.g., an instrument, machine, sensor, actuator), and the like.

In a multi-hop mesh architecture the node devices are uniquely addressable, and are capable of selecting among sets of alternative intermediate node devices in establishing a communications path to route messages from an originating node device toward the intended destination node. The particular path from the origination device to the destination is a function of the criteria defined within the routing protocol applied within the network. In general, each of the node devices can be an originating and destination node device as well as act as a relay device. Thus, node devices perform both, message forwarding, and message origination/consumption functions. This also means that communication link activity can be variable across the network and quite heavy at certain devices of the network as a function of the source-destination traffic patterns and the available intermediate devices' connectivity.

Wireless multi-hop mesh networks in particular face other challenges. For instance, wireless links may not always be reliable: there may be intermittent interfering signals, intermittent obstructions, including large movable objects (e.g., vehicles) moving in and out of the transmission path, weather affecting the quality of radio signal propagation, etc., affecting the signal strength of transmissions seen by the receiving node. Also, certain node devices may be situated near the limits of their radio's communication range, relative to a node neighbor, which further compounds signal reception challenges.

In ad hoc, multi-hop RF mesh networks nodes form dynamic associations with their local neighbors. In general, network connectivity is established based on node information broadcasts and dedicated routing information communications exchanges between neighbor devices. Evaluated link connectivity and routing information exchanges allow each node to derive optimal forwarding paths to other nodes in the network and to gateway nodes that act as the access points into and out of the RF network.

In a multi-hop network, nodes can receive or initiate neighbor connection requests for network route maintenance or to relay traffic across the network at any time. However, with a single RF transceiver, each node is limited to communicating with a single neighbor at any given time. Where nodes operate in a single communications mode (as defined, for example, by particular frequency channelization, transmission modulation, or multi-access methods), an idle node is able to continuously monitor for neighbor connection requests and can initiate its own connection to a selected neighbor at any time.

Where nodes are capable of operating in more than one transmission mode, such as where nodes can selectively transmit using different modulation techniques, there needs to be a higher degree of coordination or organization if nodes are to be able to asynchronously connect with neighbors with minimum delay when a connection needs to be established for routing exchange, message relay, or other communications exchange.

One known way to coordinate the multiple modes in a multi-hop mesh network relies on some form of centralized timing control in which network-wide time synchronization prescribes dedicated time periods during which the different transmission modes can occur at particular nodes. For ad hoc networks, where there can be dynamic, overlapping sets of associations between groups of nodes that are within radio range of one another, such a centralized coordination approach would be unfeasibly restrictive. It would be inefficient and impractical to pre-define periods for communications in one mode or the other for each and every node across the network. If such an approach were attempted for a generalized communications network, the asynchronous, stochastic nature of initiated network connections and data flows would result in significant network delays in the transfer of data between source-destination points. At each hop traffic would be forced to wait for the time availability of the particular mode in communicating from one neighbor to the next along the forwarding path. Furthermore, where nodes in a multi-hop or mesh network environment can have tens or even hundreds of neighbors depending on network size, any form of centralized control would severely constrain the practical limits of network scalability.

A solution is needed for a practical, adaptive network, in which multi-mode communications can be utilized effectively, particularly under dynamically changing circumstances and traffic exchanges that may be associated with a general ad hoc network.

SUMMARY OF THE INVENTION

One aspect of the invention is directed to a distributed, loosely coupled, ad hoc communications network in which node devices can operate in two communication modes: a long-range communication mode, and a short-range communication mode. The long-range communication mode offers greater reliability and geographic separation between connectable nodes, whereas the short-range communication mode offers faster (higher speed) data transfer rate. Individual node devices implement localized control and coordinate their own transitions between communications modes according to their present circumstances, such as whether they have established node neighbors capable of operating in either one or both modes, for example, and with how many such neighbors a given node device has established connectivity. In such a system each node device can locally decide which communication mode should be used to access the network given available neighbor link alternatives. The decision can be based on such factors as data throughput performance offered through various neighboring nodes, or based on specific connectivity requirements for a given application service.

In a related aspect of the invention, each node device provides connectivity to its neighbors in both communication modes, allowing those neighboring nodes to independently select the communication mode with which to establish connection to the node device. Regardless of the mode of connectivity used by any given node device, and whether that device may or may not have neighbors connected in certain communication modes, support is maintained for connectability in both modes. In certain embodiments, the degree of this connectability is varied to efficiently suit the prevailing circumstances in the local neighborhood.

In one example embodiment, a node device is provided for use with a self-organizing wireless multihop network containing a plurality of other node devices and at least one gateway device, each node device being within wireless communication range of one or more neighboring node devices located in a corresponding local neighborhood. The node device includes radio communications circuitry, and a controller interfaced with the radio communication circuitry. The controller has a processor and a non-transitory data storage medium containing instructions executable on the processor, that, when executed, cause the controller to implement a communication mode control module.

The communication mode control module causes the radio communications circuitry to selectively operate in the short-range (SR) communication mode, and in the long-range (LR) communication mode, where the SR communication mode utilizes a higher data rate than the LR communication mode for any given communication bandwidth. The communication mode control module controls operation of the radio communications circuitry to (a) advertise connectivity link availability for neighboring node devices, and (b) selectively initiate a link in response to connectivity availability advertised by at least one neighboring node device.

The operation of (a) is performed in both, the SR communication mode, and the LR communication mode, according to a periodicity that is dynamically-variable in response to prevailing circumstances in the local neighborhood. The operation of (b) is selectively performed in one of either the SR communication mode or the LR communication mode, based on selection criteria that include data throughput performance associated with different neighboring node devices with which connectivity is available via a certain communication mode. The selected mode may also be determined by the availability of a particular application service accessible via a particular network node.

In a related aspect of the invention, a method for operating a node device is provided for use in a self-organizing wireless multihop network containing a plurality of node devices and at least one gateway device, each node device being within wireless communication range of one or more neighboring node devices located in a corresponding local neighborhood. The method includes performing communications in a short-range (SR) communication mode, and in a long-range (LR) communication mode. The SR communication mode utilizes a higher data rate than the LR communication mode for any given communication bandwidth. Connectivity link availability is advertised for neighboring node devices, and a link is selectively initiated in response to connectivity availability advertised by at least one neighboring node device.

Advertising the connectivity is performed in both, the SR communication mode, and the LR communication mode, according to a periodicity that is dynamically-variable in response to prevailing circumstances in the local neighborhood. Initiation of the link is selectively performed in one of either the SR communication mode or the LR communication mode, based on selection criteria that include data throughput performance associated with different neighboring node devices with which connectivity is available via a certain communication mode.

Advantageously, in the dynamic adaptive, multi-hop mesh environment, and operation thereof, facilitated by aspects of the invention, nodes are able to continually assess the neighbor environment independent of the communication modes used by different neighbors. This capability ensures that the self-organizing, self-adapting nature of the network is maintained even where single and dual-mode nodes are part of the same network. A number of other advantages will be apparent from the Detailed Description that follows.

BRIEF DESCRIPTION OF THE DRAWINGS

The invention may be more completely understood in consideration of the following detailed description of various embodiments of the invention in connection with the accompanying drawings, in which:

FIGS. 12A and 12B illustrate various communication exchanges between a node device and its neighbors.

FIG. 13 is a table illustrating sets of predefined communications parameters that are defined based on selected channel bandwidth and spreading factor, according to one embodiment.

DETAILED DESCRIPTION OF THE EMBODIMENTS

A multihop network is one where node devices transmit data messages to one another, including, where necessary, through intermediate node devices that can act as routing devices for purposes of relaying data messages towards their final destination. The destination can be an endpoint node device on the local network, or a gateway node device that provides a connection between the local network and another network. A well-known example of a multihop network is the radio frequency (RF) mesh network topology. Embodiments of the invention may be used in a variety of applications involving data communications. One such application is in energy metering, such as a RF mesh advanced metering infrastructure (AMI) network that can provide utilities with a single integrated-mesh network for electric, water and gas data communications with the ability to support multiple meter vendors and multiple utility application services (including demand response, DR, and distribution automation, DA). However, it should be understood that the principles of the invention are applicable in a variety of different application networks besides energy metering.

In an exemplary implementation, a radio communications system for data exchange between wireless network nodes operates in an industrial, scientific, and medical (ISM) radio band. ISM bands are internationally-recognized portions of the radio spectrum that are reserved generally for RF communications in either licensed, or unlicensed mode, according to the applicable regulatory limitations on transmission power, transmission duration, and spectrum utilization.

Figure 1A:
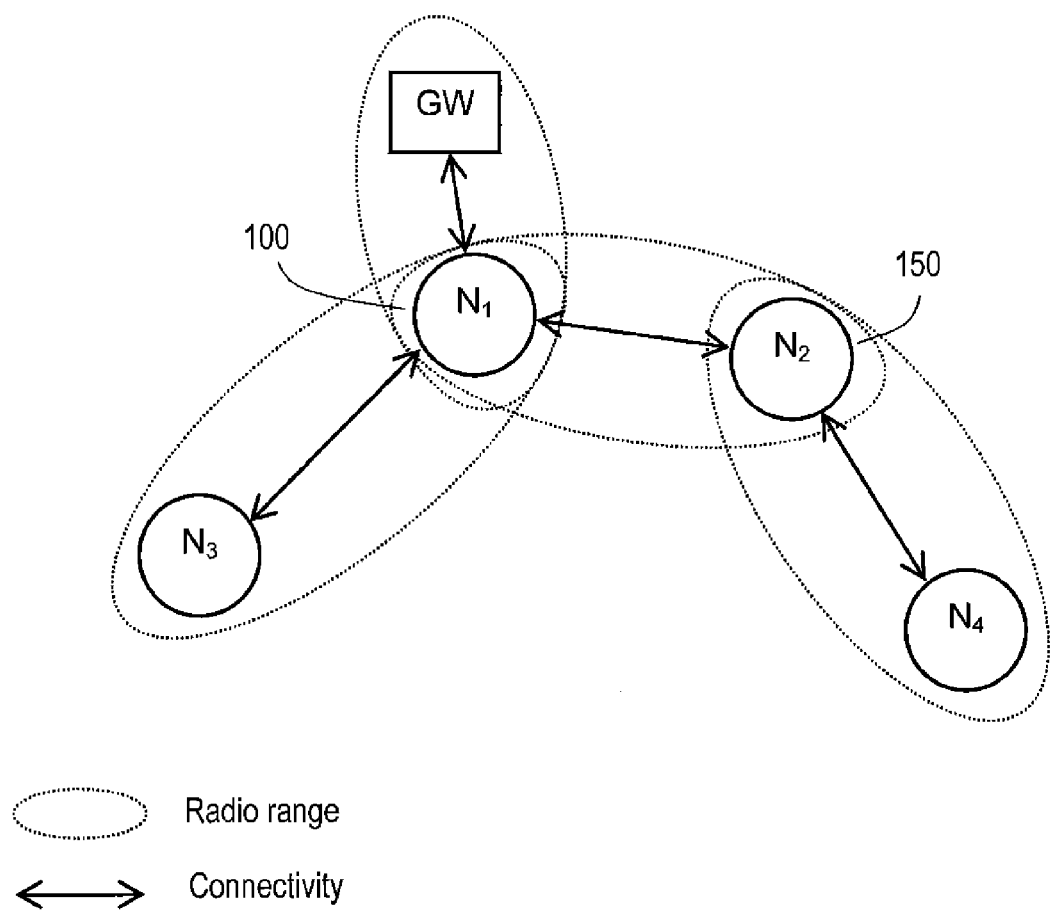
FIG. 1A is a network topology diagram illustrating an exemplary wireless multihop network in which embodiments of the invention may be applied.

FIG. 1A is a diagram illustrating an exemplary wireless multihop network. Endpoint node devices $N_1$-$N_4$ act as sources and destinations of data to be communicated, as well as potential relays of data to be forwarded to its destination. Gateway node device GW provides a connection between the local network and another network. The areas shown in broken lines represent the radio ranges for the various node devices and can each be considered as a local neighborhood for the associated devices. Those node devices which are within radio range are referred to herein as neighboring devices or, simply, neighbors. Thus, devices $N_1$ and $N_2$, within communications range of each other, are indicated respectively by reference numerals 100 and 150.

In data collection systems, such as AMI systems, although data may be sent from any node to any other node, and although commands can be sent down from the gateway GW to one or more node devices, the majority of the application service data flow is between the node devices and their associated gateway device GW. Neighboring node devices can thus be viewed hierarchically relative to the gateway device GW. Intermediary node devices through which communications must pass in order to reach the gateway GW can be viewed as parent nodes, whereas the downstream node devices can be referred to as child nodes. That is, along the multi-hop communications path between a node and the GW the node neighbor that is 'closer' (along the formed routing path) to the GW will be a 'parent' node to the connected neighbor device that is (one hop) farther away.

The radio range depicted in FIG. 1A is limited such that only node device $N_1$ can create a direct link to the gateway device GW. Node devices $N_2$ and $N_3$ are therefore children of parent node $N_1$. Similarly, node device $N_4$ is a child of node devices $N_2$ (and a descendant of $N_1$). Node device $N_4$ can thus have messages sent along route $N_2 \rightarrow N_1 \rightarrow GW$ for communications with the GW.

Figure 1B:
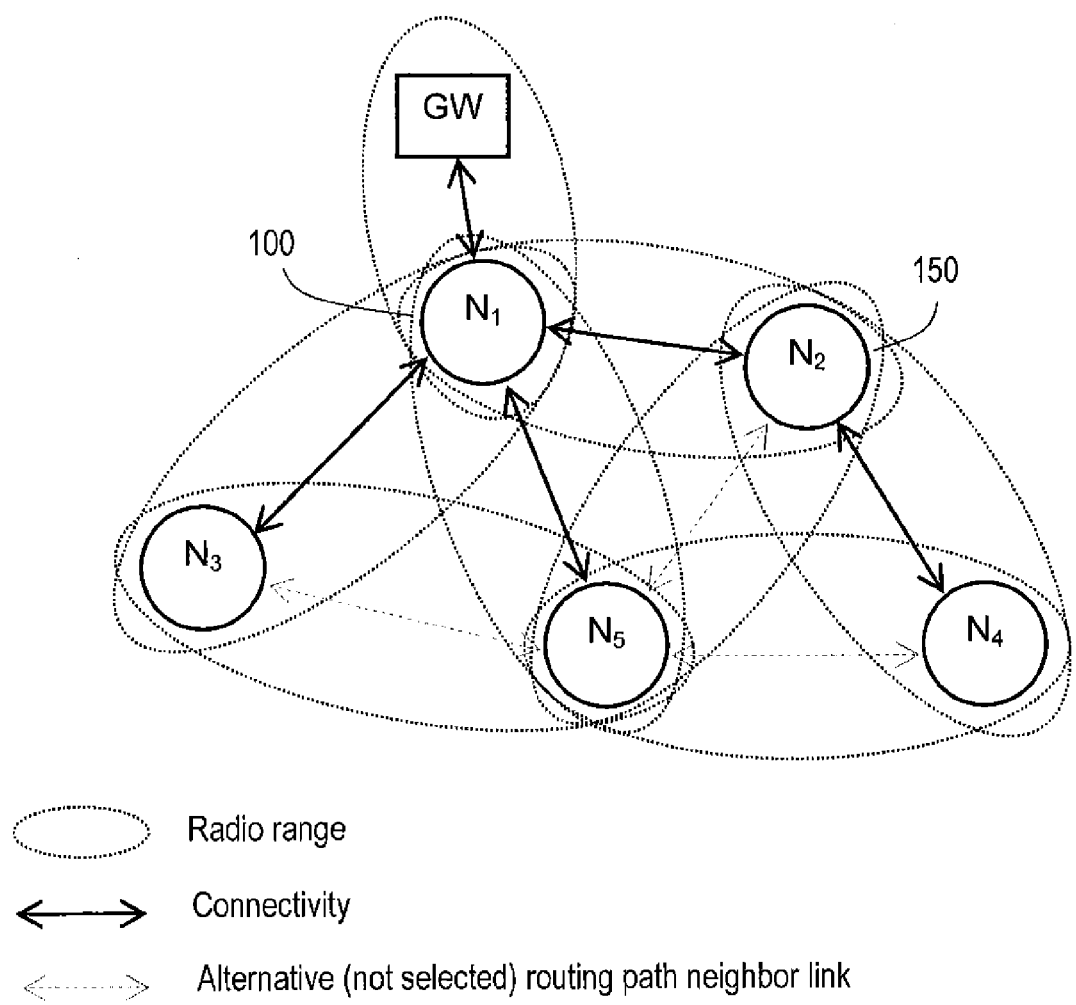
FIG. 1B is a diagram illustrating aspects of RF multi-hop mesh connectivity in which data network communications paths are established by selection among alternative neighbor links, according to certain aspects of the invention.

FIG. 1B illustrates an extended network in which an additional node N5 is deployed. Based on the established routing path connectivity between nodes and the GW, node $N_4$ is connected to the GW through the parent $N_2$, but also has the potential for connectivity through an alternative link connection to neighbor node $N_5$ if node device $N_2$ becomes unavailable or operates with a reduced performance (as measured, for example, by data path throughput). Reduced performance can be caused by a variety of conditions. For instance, the link to from $N_4$ to $N_2$ may become less reliable due to temporary or permanent obstructions or signal interference. Similarly, the link from $N_2$ to $N_1$ may become degraded. Node device $N_2$ may also be serving a large number of other children, so that in time-multiplexing communications with its children the potential throughput availability that node device $N_4$ receives may be effectively lowered. Also, node $N_2$ may have a higher loading factor due to other application processing tasks, such that its computing capacity is reduced, thereby limiting its effective communicating availability. A set of metrics referred to as link cost, and path cost, which can be applied to derive a measure of data communications throughput can be used to numerically represent the performance of certain neighbors in delivering messages. These may be applied ahead of the device loading type metrics. A variety of other measures of node and link performance are well-known, including received signal strength indications (RSSI), expected transmission count (ETX) for measuring link cost, hop counts, etc. can be applied individually or collectively in measuring path cost used to influence connectivity choices across the network. As used herein, the terms link cost, or path cost, are meant to encompass any suitable approach for measurement of neighboring node connection or routing path performance, respectively, whether presently known, or later-developed.

Figure 1C:
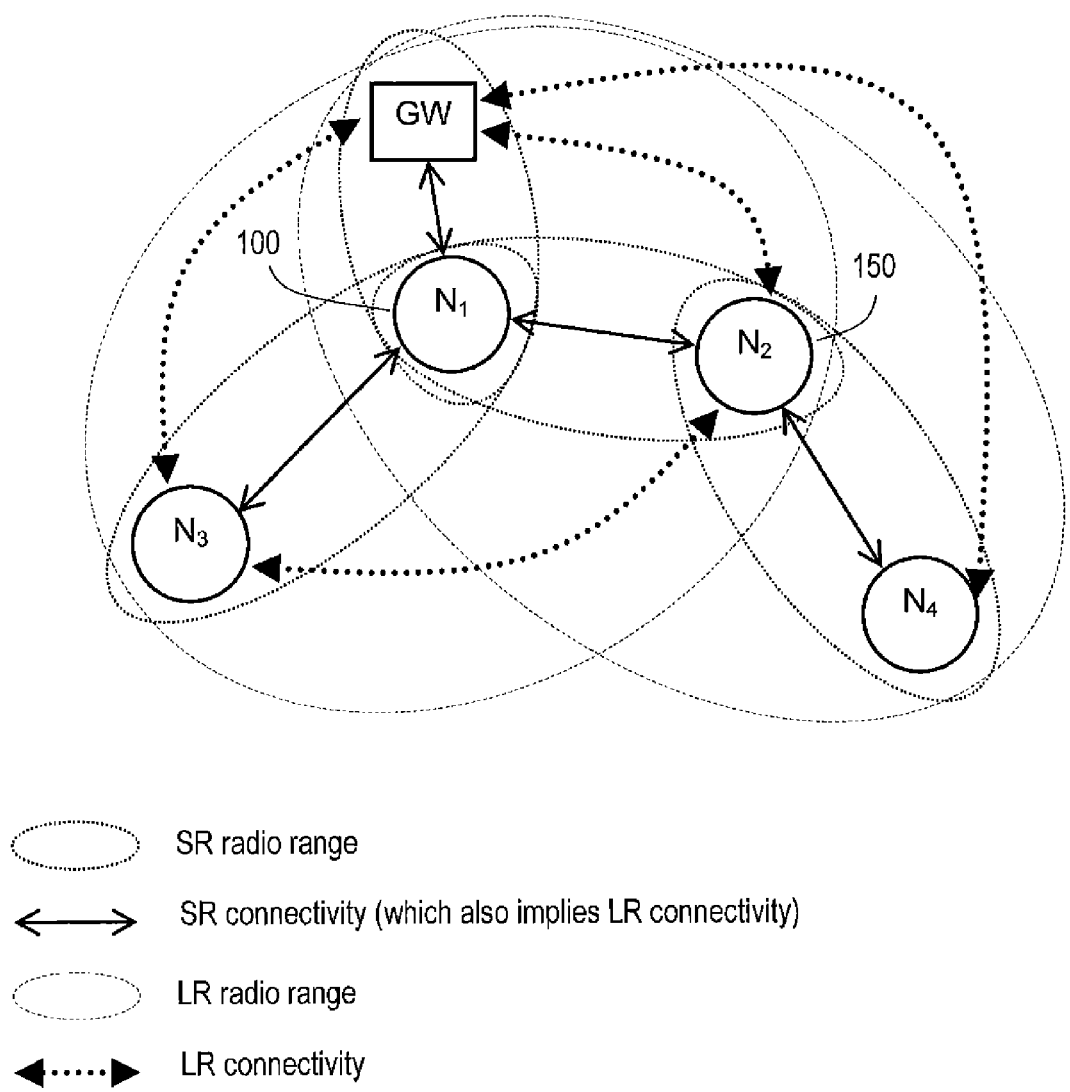
FIG. 1C is a diagram illustrating a comparison of short-range (SR) long-range (LR) communication modes for some of the node devices shown in FIG. 1A, according to one embodiment.

FIG. 1C is a diagram illustrating a comparison of short-range (SR) and long-range (LR) communication modes. The radio communication range depicted in FIG. 1A is denoted SR in FIG. 1C. A second radio communication mode, LR, is depicted in FIG. 1C, and shown in dashed lines. As its name implies, communication mode LR has a greater reach than mode SR. In the example shown, node devices $N_2$, $N_3$, and $N_4$, as well as gateway device GW, are capable of dual-mode operation, meaning that each of these devices can operate selectively in one of either of the modes LR or SR. Node device $N_1$ is a SR-only device. As can be seen in FIG. 1C, using LR mode, node devices $N_3$ and $N_2$ can connect directly to gateway GW, without requiring a multi-hop connection through intermediary node device $N_1$. Node $N_3$ and $N_2$ can also connect to each other directly in LR mode, without requiring a multi-hop connection. Node device $N_4$ can connect to node device $N_2$ through either mode and may also be able to directly connect to GW in LR mode. Note that where two nodes are SR mode neighbors they are also potential LR mode neighbors where both nodes support SR and LR mode communications capability.

Figure 1D:
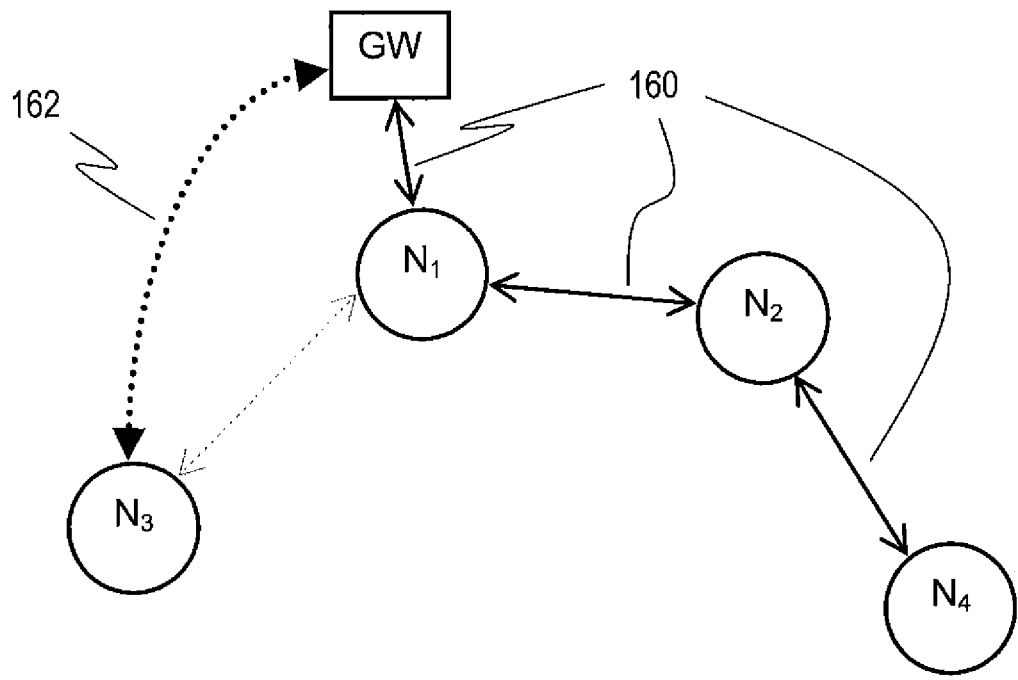
FIGS. 1D and 1E illustrate multi-modal operation of a node using both, the SR, and LR, communications modes according to various embodiments.
Figure 1E:
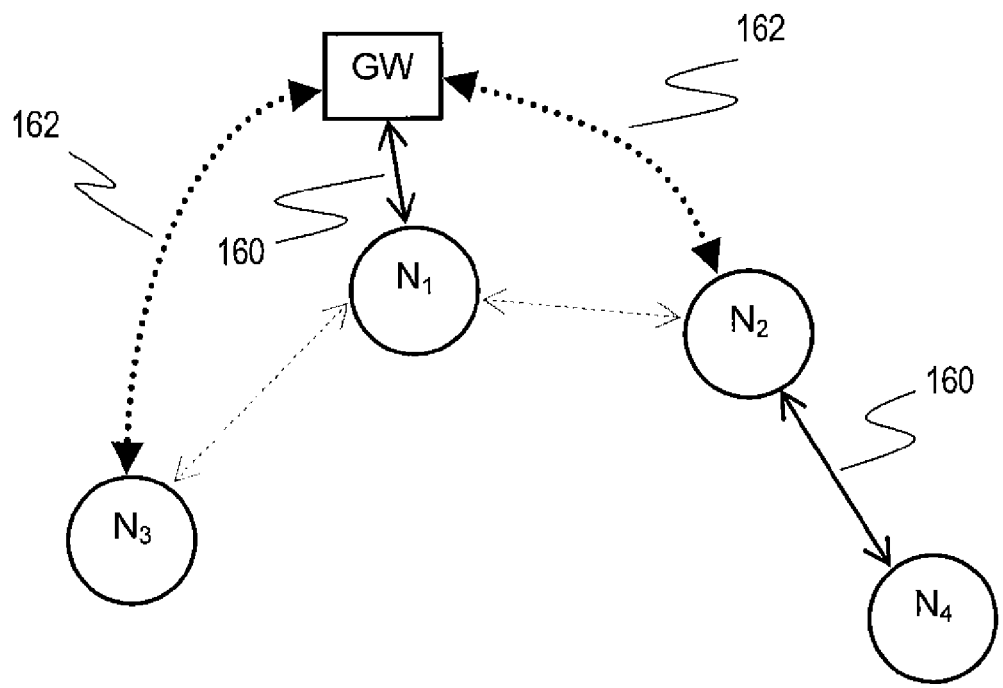
Figure 1F:
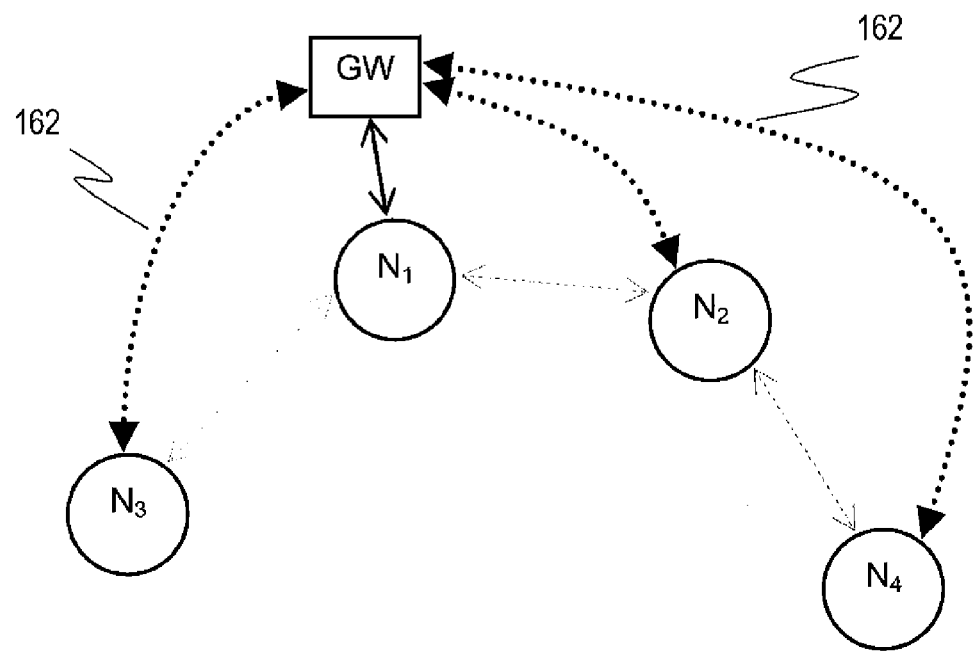
FIG. 1F is a diagram illustrating multi-mode nodes applying the LR communications mode for communications to the gateway device for purposes of connectivity to and from the gateway for a given application service, even where alternative modes may apply for general data transfers between the nodes and the gateway, according to one embodiment.

FIGS. 1D, 1D and 1F illustrate multi-modal operation of network nodes using both, the SR, and LR, communications modes according to various embodiments. As depicted in FIG. 1D, node device $N_1$ connects to gateway device GW, and operates as a parent to node devices $N_2$. Notably, the communications with node device $N_2$ is via SR mode 160, while node device $N_3$ has the option of directly connection to the GW via LR mode 162 or using a multi-hop SR mode connection via $N_1$. Based on the example routing path connectivity depicted, the path performance criteria dictates that node $N_3$ connect directly to the GW in LR mode rather than using the SR mode connection through node device $N_1$. For all data transfers or other communications exchanges between $N_3$ and $N_1$, the SR mode (as the only one supported by $N_1$) is used. In the example depicted in FIG. 1E, node device $N_1$ connects with gateway GW via SR mode 160, while node devices $N_2$ and $N_3$ directly connect to the GW using LR mode 162. Even as node $N_2$ connects to the GW using LR mode, it supports connectivity of node $N_4$ as a child node using a SR mode connection. In either of these examples in FIGS. 1D and 1E, $N_1$ can be a child node of a parent node device (not shown), rather than being a first-level node device with a direct connection to gateway GW as shown. In the example depicted in FIG. 1F, node devices $N_2$, $N_3$ and $N_4$ use LR mode for directly connecting to the GW for purpose of accessing a specialized application service (such as alarm or status messaging) that is available using LR mode communications. In this example, the LR mode is preferentially selected for this application-specific purpose even though the SR mode is otherwise available for use.

In one embodiment, the SR mode utilizes a frequency-hopping spread spectrum (FHSS) technique and associated transmission modulation that offers relatively higher data rates than the LR mode for a given bandwidth and transmission power. Where link budget permits, nodes are able to apply higher order modulation to increase their transmission data rates. Typically, the FHSS operation is based on a quasi-random frequency hopping among a set of available channels in the ISM band being utilized. For instance, particular systems operate using fifty 500 kHz channels in the 915 MHz ISM band, the 2.4 GHz ISM band, or the 5.7/5.8 GHz ISM band.

The LR mode according to this embodiment utilizes a direct-sequence spread spectrum (DSSS) technique, that along with associated channelization offers improved link margin over the SR mode, though at the cost of reduced data rate for a comparable transmission bandwidth and transmission power. To illustrate, in one embodiment, the SR mode provides data rates of hundreds of kbps, with typical communication ranges of hundreds of meters to kilometers at a transmission power of 1 Watt (as permitted by FCC ISM band operating specifications) based on the given propagation environment. By comparison, the LR mode, according to various configuration settings in one embodiment, supports data rates ranging from hundreds of bps through a few tens of kbps. However, the increased link budget of the LR mode allows communications at much greater distances in the range of kilometers to greater than ten kilometers at the same transmission power and operating in the same ISM frequency band and propagation environment.

In one type of embodiment, the LR mode uses frequency hopping in manner similar to that applied in SR mode. Accordingly, the LR mode of this embodiment utilizes a pseudo-random frequency hopping operation across multiple channels while applying DSSS mode transmission within each utilized channel. The channels utilized conform to those defined for the FHSS system operation. In one embodiment, the addition of DSSS transmission within the FHSS-defined channel does not widen the bandwidth requirement; rather, for the DSSS mode transmission is adapted to the defined FHSS channel bandwidth. The advantage of this trade-off is that the additional overhead provided by the DSSS chips improves the link margin of the LR mode transmission such that, for a given transmission power, greater transmission range can be achieved while simplifying the integrated system operation through the use of a common set of channels for both system modes.

Applied together in a single network according to embodiments of the present invention, selectable SR/LR operation made possible by dual-mode endpoint devices offers greater flexibility and adaptability in network connectivity by allowing wider tradeoffs between communications data rates and transmission ranges that can be supported between node neighbors with a single mode system. Advantageously, a node device can achieve maximum data rates using SR mode when communicating with nearby unobstructed neighbors while connecting over longer ranges at lower data rates using the LR mode when other closer-range connectivity does not exist, or when a LR mode is preferred for application-specific connectivity or to meet certain performance optimization requirements. Furthermore the integrated system allows support for specialized single mode devices even in a self-organizing network of dual mode SR/LR devices.

Figure 2:
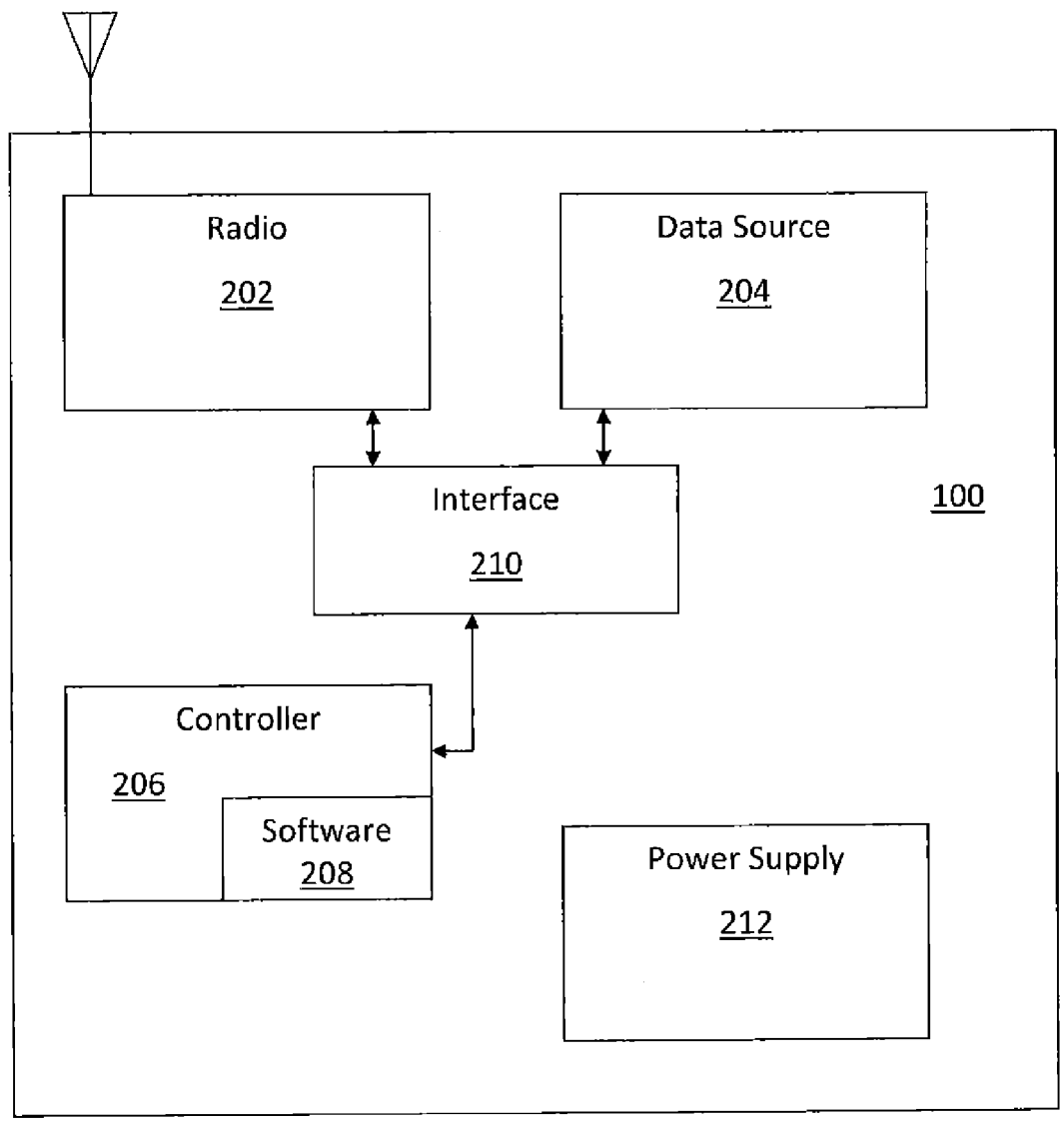
FIG. 2 is a block diagram illustrating parts of an exemplary node device according to one embodiment of the invention, including a radio circuit.

FIG. 2 is a block diagram illustrating portions of node device 100. Node device 100 includes radio communications circuit 202 having transmitter and receiver portions. In one example embodiment, which is described in greater detail below, the radio circuit includes both, a FUSS radio module, as well as a DSSS radio module. In one embodiment these functional modules may be firmware-controllable capabilities of a common radio device. Data source 204 is that portion of node device 100 which is served by radio communications circuit 202, and provides any one or more of a variety of primary functions of node device 100 besides the communication function. For example, in an AMI application, data source 204 may be an application processor that interfaces to a utility meter or may be a utility meter itself. In an industrial control application, data source 204 may be an instrument, sensor, or actuator; in an information technology application, data source 204 may be a computer system.

Controller 206 oversees and coordinates functionality of radio communications circuit 202 and, in some architectures that integrate the communications portion and data source portions of node device 100, controller 206 controls the operation of data source 204. In other embodiments, data source 204 can have its own controller. In one embodiment, controller 206 includes processing hardware, such as one or more processor cores, memory units (volatile, non-volatile, or both), input/output facilities, data bus, and other such processing-related components. Controller 206 also includes software 208, which in various embodiments can include an embedded system, an operating system, device drivers, and other system code. In addition, software 208 includes application-level code that defines the higher functionality of node device 100, including operation of the communications and software upgrade modules detailed hereinbelow. Interface circuit 210 facilitates input and output of application and control data between radio communications circuit 202 and data source 204 according to the embodiment depicted in FIG. 2. In one embodiment, interface circuit 210 includes an digital to analog (D/A) or analog to digital (A/D) circuit, or both. In related embodiments, interface circuit 210 can include one or more of: a bus circuit, a serial port, a parallel port, or any combination thereof.

Power supply circuit 212 provides electrical power for use by the other circuitry of node device 100. Various circuitry may have different power requirements, such as different supply voltages, source or ground isolation, or the like. Accordingly, power supply 212 provides the needed power requirements. In one embodiment, power supply circuit 212 includes the energy source, such as a battery, for example. In other embodiments, power supply 212 includes a power capture circuit such as a photovoltaic cell, for example, or an electrical generator circuit. In still other embodiments, power supply circuit 212 relies on externally-supplied power, such as from an AC mains source, and converts and conditions that power to the various supply taps for the other portions of node device 100.

Figure 3:
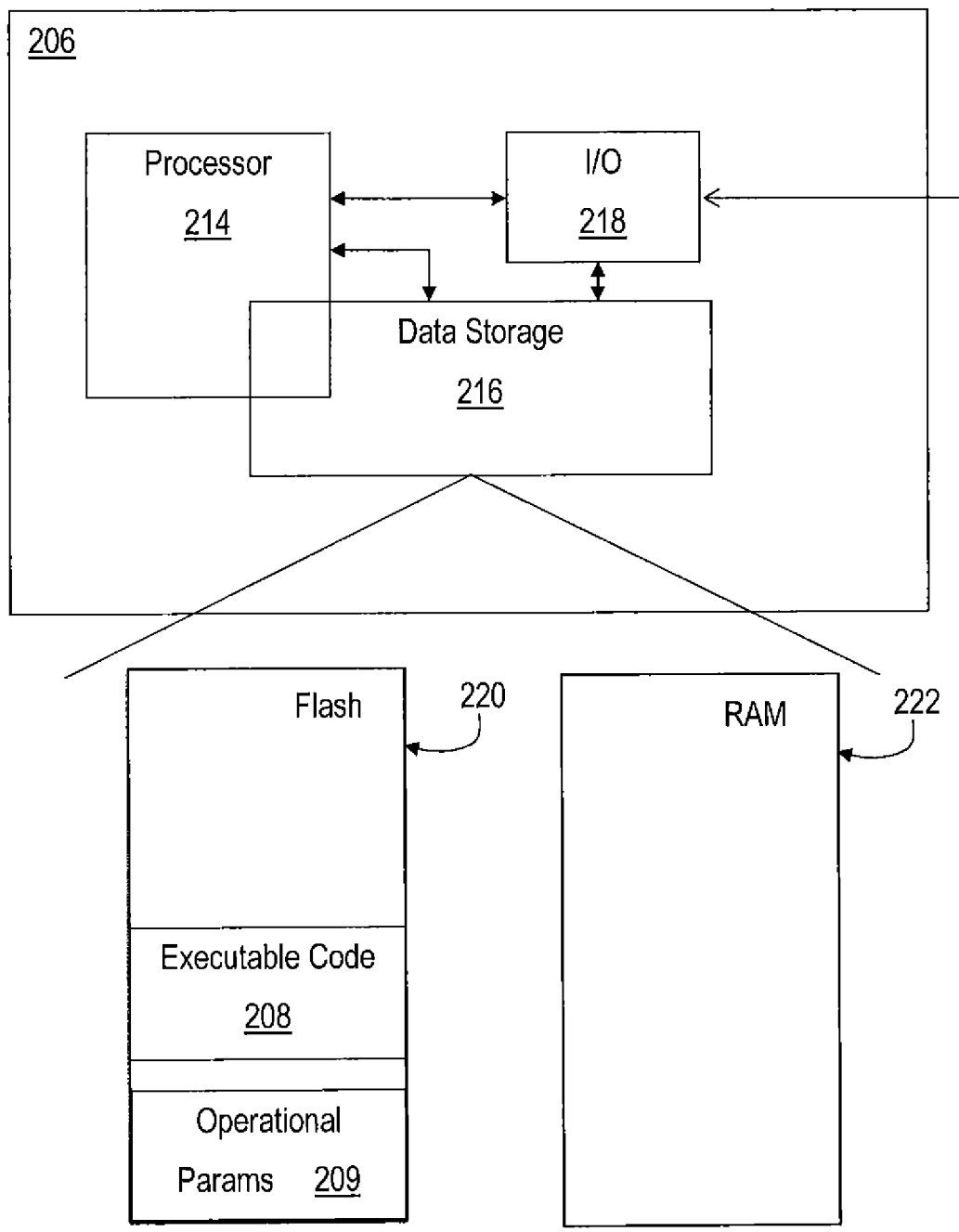
FIG. 3 is a block diagram illustrating parts comprising the controller of the exemplary node device of FIG. 2, including a data storage medium with program instructions and operational parameters.

FIG. 3 is a block diagram illustrating some of the components of controller 206 according to one embodiment. Controller 206 includes processor 214, which includes such parts (not shown) as a control unit, an arithmetic/logic unit (ALU), registers, cache memory, and the like. Processor 214 can include a single or multi-core processor of any suitable architecture (e.g., RISC/CISC), a microcontroller with integrated additional components, a digital signal processor (DSP), etc. Processor 214 is interfaced with data storage 216, which can take any of a variety of suitable forms, and their combinations. For example, RAM, electrically-erasable programmable read-only memory (EEPROM)—e.g., Flash, disk, and the like, or a combination thereof. In the case of a microcontroller embodiment, some of the data storage 216 may be integrated with the control unit and ALU, and other components, as represented by the partial overlap of these blocks in FIG. 3. Some parts of the data storage 216 may be situated externally to the processor 214. Input/output facilities 218 include circuitry such as a system bus interface that permits interfacing with other components of node device 100, including some portions of data storage 216 (such as the case with an external flash device interfacing via system bus).

Also depicted in FIG. 3 is an exemplary organization of content within data storage 216 according to one embodiment. In this example, data storage 216 includes a non-volatile memory devise, such a flash device 220, which may be part of a microcontroller embodiment of processor 214, or external to processor 214. Flash device 220 stores the executable code of software 208, along with operational parameters 209, and other variables that may be stored in the course of execution of software 208. Data storage 216 may also include a random access memory (RAM) device 222, which may be used to store parts (or all) of executable code 208 for faster access during execution, as well as "scratchpad" memory space.

To implement an extensive set of functions, controller 206 operates under the control of the program instructions of software/firmware 208. In this regard, each part of the functionality may be viewed as an operational module. In general, the term module as used herein means a real-world device, component, or arrangement of components implemented using hardware, such as by an application specific integrated circuit (ASIC) or field-programmable gate array (FPGA), for example, or as a combination of hardware and software/firmware, such as by a microprocessor system and a set of instructions stored on a non-transitory storage medium to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor core(s) of controller 206, or in other circuitry (e.g., radio 202). Accordingly, each module can be realized in a variety of suitable configurations, and should not be limited to any particular implementation exemplified herein.

The operational modules in one example embodiment, include such operations as communications (including forming message packets, forwarding messages addressed to other devices, message routing, error detection/correction, packet framing, following communications protocol, etc.), operation of data source 204, various security-related operations, receiving and processing commands, performing software upgrading-related operations, and others.

Table 1 below lists a set of abstraction layers that implement major portions of the communications functionality according to one embodiment. Although the abstraction layers describe a software architecture, it should be noted that the software architecture configures the controller hardware into a plurality of functional modules.

TABLE 1

Exemplary Abstraction Layers

| Layer | Data unit | Primary function(s) |
|---|---|---|
| Application | Data | Network process to data source |
| Network | Packet | Packetization of data; routing path determination; neighbor management |
| | | Radio Abstraction Interface (RAI) |
| SAR | Segment | Segmentation and reassembly of packet segments |
| MAC | Frame | Coordination of the link state between two devices, including when link access may and may not occur; frame level authentication, and data reliability. |
| Link | Frame | Parsing and packing frames; connection/synchronization, reliable data delivery, communication mode selection and implementation |

The application layer provides the communication system interface for data source 204. Accordingly, the application layer processes and pass data from data source 204 to be transmitted via radio communications circuit 202, and provide data received to data source 204 in the appropriate format. The network layer serves the application layer primarily by packetizing data for transmission. Packets generally contain portions of the data as a payload, and further include control information for routing the packet and reassembling the data it contains. In this exemplary implementation, routing is performed at the network layer. Neighboring node management and information maintenance including associated neighbor link statistics is supported as a sub-function of the network layer. The radio abstraction interface (RAI) translates standardized function calls by the network layer to radio-specific or protocol-specific instructions for lower layers, and vice-versa. This allows the application and network layer codes to be universal to all radios and protocols which support the RAI.

The segmentation and reassembly (SAR) layer applies further coding to packets and, in some implementations, further divides the packets. Different SAR processing may apply respectively according to the radio transmission mode in which the node device is currently operating. The medium access control (MAC) layer coordinates the link state between two devices, including when link access may and may not occur. In one embodiment, the MAC layer maintains a link connection state machine and insures the reliable delivery of data traffic via ACK/retransmission procedures. In a related embodiment, the MAC layer provides the mechanism to insure that the link is properly authenticated and lays the basis for establishing encrypted communications before data traffic is allowed to traverse the link. These functions may differ according to radio transmission mode.

The link layer provides lower-layer services to the MAC layer. In one such embodiment, the link layer handles the details of the link layer protocol, including parsing and packing the data messages into frames. In addition, link layer implements the connection/synchronization and reliable data delivery procedures. As part of carrying out this functionality, in multi-mode node devices, the link layer also determines which mode to use in communicating with specific node devices, and performs the necessary operations to carry out that functionality.

In certain embodiments, messages that are communicated between node devices are generally sent using a connection-oriented protocol in which there is a handshaking process of negotiation between node devices before normal communication over the channel begins. Handshaking dynamically sets parameters of a communications channel established between the two node devices. It follows the physical establishment of the channel and precedes normal information transfer. Typically, this functionality is handled at the lower layers (i.e., MAC or link layer). Connection-less data transfers, where messages can be directly sent or received without the establishment of a dedicated radio connection, may also be supported by the link layer.

Figure 4:
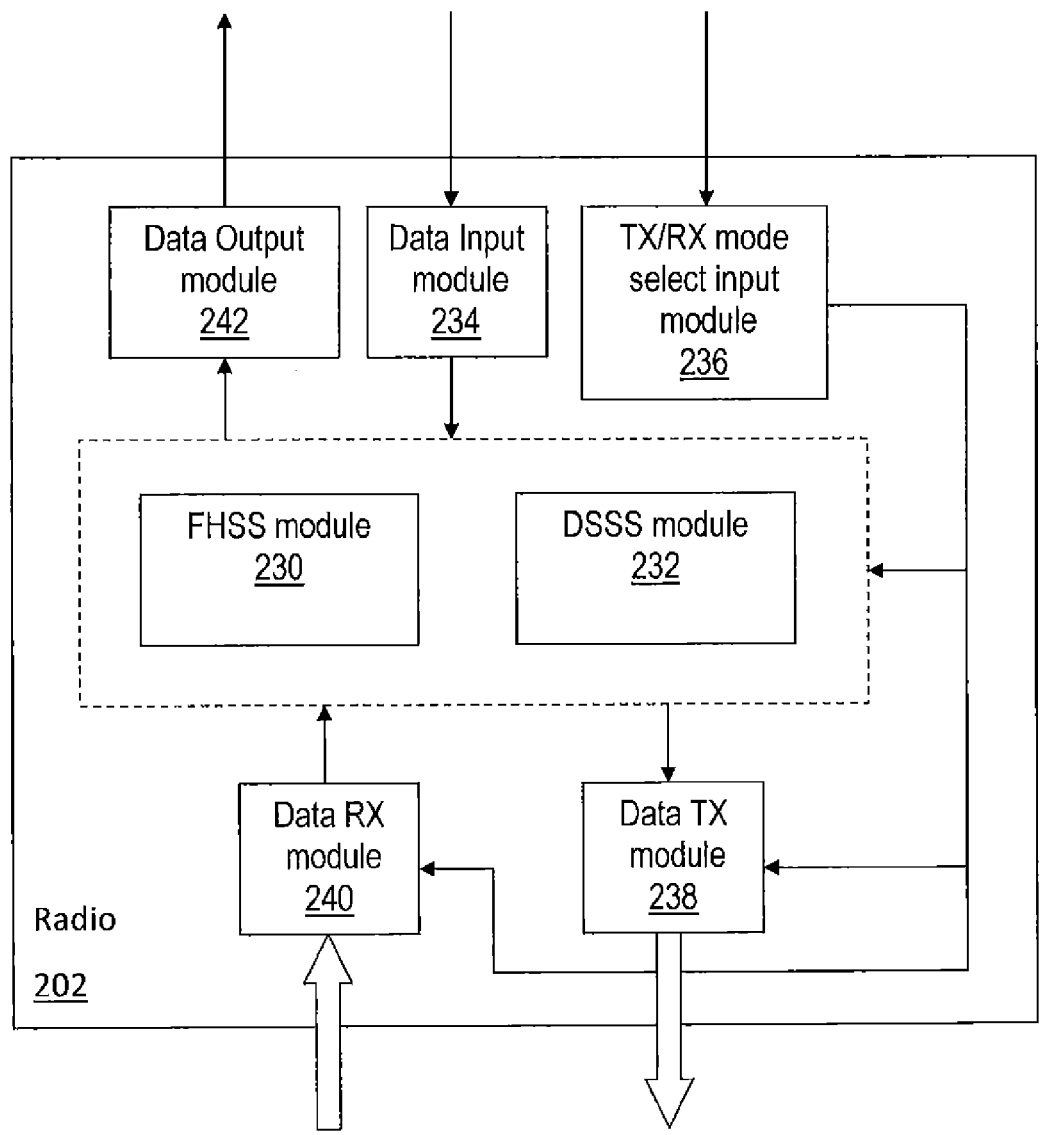
FIG. 4 is a block diagram illustrating exemplary functional modules of the radio circuit of FIG. 2.

FIG. 4 is a block diagram illustrating exemplary functional modules of the radio communications circuit 202 of FIG. 2 according to one embodiment. Radio communications circuit 202 implements a FIBS module 230, which is configured to modulate and demodulate data to be transmitted and received, respectively, via (short range) FHSS mode. Similarly, (long range) DSSS module 232 is configured to modulate and demodulate data to be transmitted and received, respectively, via the DSSS mode. For transmission, the baseband data to be transmitted is passed to data input module 324, which buffers the data and provides the data in suitable segments to either the FUSS module 230, or the DSSS module 232. In certain embodiments, data input module 234 may further encode the input data to apply certain signaling, a layer of security, or some combination thereof.

Transmission/reception mode selection input module 236 receives an input indicating the type of spread spectrum modulation to be used from among FHSS and DSSS for both data transmission and when the device is in reception mode. Accordingly, transmission mode selection input module 236 instructs FHSS module 230 and DSSS module 232 to act on the data received by data input module 234. In embodiments where the DSSS mode is applied in conjunction with frequency hopping, the DSSS module 232 processes data to be transmitted together with applicable instruction for implementing specified channel hopping.

Data transmission module 238 is configured to transmit the modulated signal according to the transmission protocol. For FHSS mode, data transmission module 238 receives a frequency hopping instruction sequence from FHSS module 230 that indicates the transmission frequency for each consecutive FHSS channel. Data transmission module 240 provides the carrier signal at the specified frequency, modulates the carrier according to the defined modulation scheme—e.g., PSK, FSK, ASK, QAM, etc. amplifies the modulated carrier according to specified transmission power (which may be variable in certain embodiments), and feeds this signal to an antenna for wireless transmission. Data receiving module 240 is configured to receive transmitted signals using inverse operations in the reverse order to those taken by data transmission module 238. The demodulated baseband signal obtained by operation of data receiving module 240 in conjunction with FHSS module 230 and DSSS module 232 is provided to data output module 242, which buffers the received data and makes it available to be read and acted upon.

Figure 5:
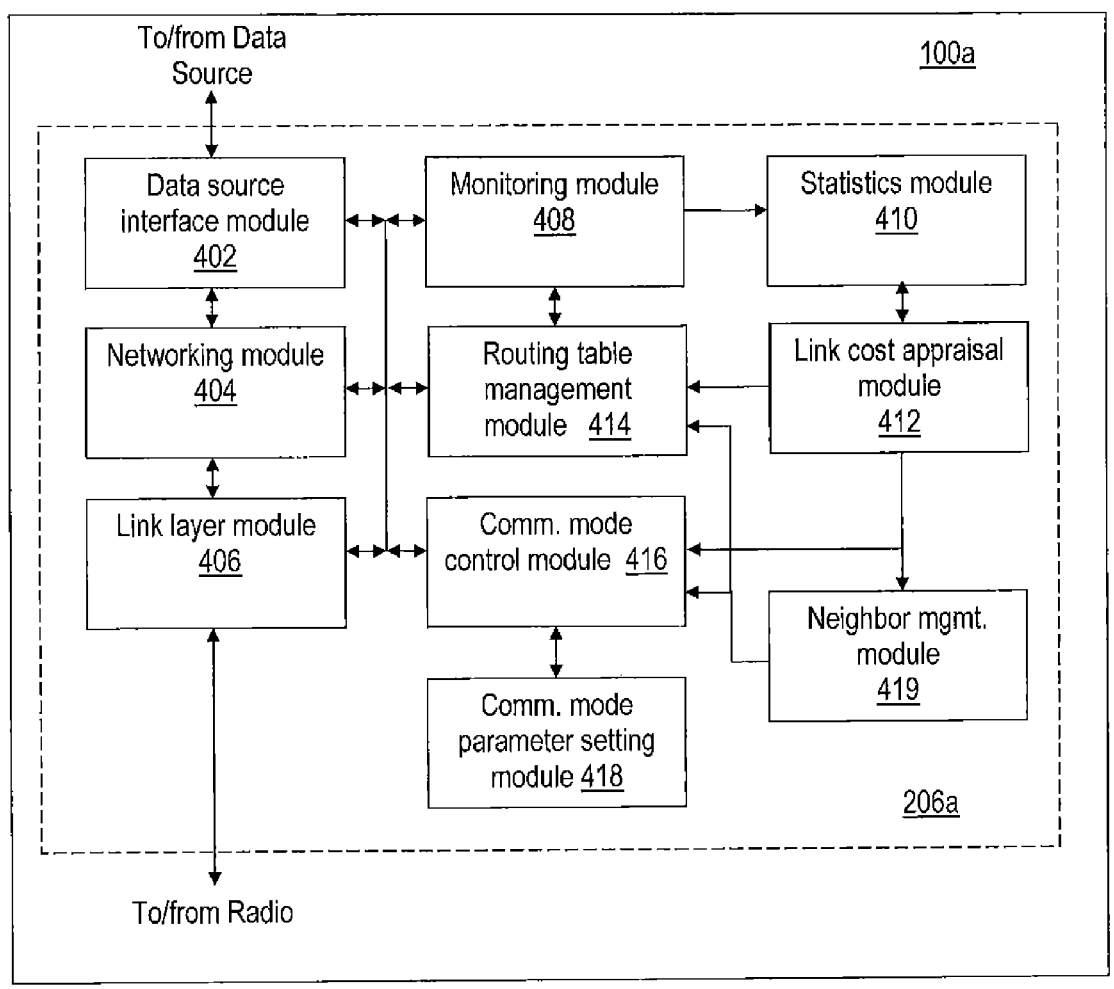
FIG. 5 illustrates some of the functional modules of the exemplary node device of FIG. 2, including a communications mode control module, and a communications mode parameter setting module, according to one embodiment.

Referring now to FIG. 5, some of the modules of an exemplary node device 100a according to one embodiment are illustrated. In the embodiment shown, node device 100a includes controller 206a with which modules 402-418 are realized. Data source interface module 402, which may be regarded as operating primarily at the application layer, exchanges raw data with the data source portion. Networking module 404, operating primarily at the network layer, performs packetization of data and routing functionality including maintaining neighbor information that identifies the transmission mode for connection with each associated neighbor. There are many known routing techniques, e.g., De Couto, Douglas S J, et al., "A High-Throughput Path Metric for Multi-Hop Wireless Routing," Wireless Networks 11.4 (2005) at 419-434, incorporated by reference herein. Embodiments of the invention contemplate that any one or more of a variety of suitable routing techniques, whether known, or arising in the future, may be utilized.

Link layer module 406 interfaces with the radio circuit and operates primarily at the link layer, carrying out the link layer operations described above according to the particular transmission mode operating at the given time. Monitoring module 408 monitors one or more transmission performance parameter, such as retransmissions, ACKs sent, failures to receive ACKs, data rate achieved, or other such observable parameter. This monitoring is performed based on transmissions sent using a connection-oriented protocol. For connection-less data reception the monitoring can take the form of measured received signal strength (RSSI), for example.

Statistics module 410 collects multiple samples of the transmission performance parameter values obtained by monitoring module 408, and performs a statistical summary of those multiple values. In one embodiment, the statistical summary represents a statistical summary, such as an average value, median value, or most frequent value. In a related embodiment, the summary statistic is weighted, for instance, a running average with greater weight attributed to more recent values.

Link cost appraisal module 412 performs the computation of link cost based on the statistical data for the actual communications links. In one type of approach, the link cost is defined as a throughput metric, such that its value represents the radio communication performance associated with the particular neighbor device serviced by the link. In various embodiments, a plurality of different metrics are combined formulaically to obtain the throughput metric.

The link cost value is passed to routing table management module 414, which updates the routing information according to the predetermined link cost-based algorithm for routing. Networking module 404 makes reference to routing table management module 414, and performs updates of the routing tables as needed. In delivering data messages, the wireless network of FIG. 1 performs a dynamic routing scheme. Link cost information is passed to and maintained by the neighbor management module 419, which also keeps track of the applicable transmission mode to the particular neighbor node.

Communication mode control module 416 determines the communication mode to be used for initiating a communication session with each individual neighbor, and for monitoring the airwaves for the presence of on-air communications to be received. As will be described in greater detail below, the communication mode control for each individual transmission is based on a communication mode control routine that takes into account a number of factors, including the availability or unavailability of communication modes, application requirements, and overall communication performance for the available communication modes. Communication mode parameter setting module 418 further specifies, for the selected communication mode, which variable parameter values to use for the present operation. For instance, in a given LR communication mode, there may be different data rates or different spreading factors from which to select for creating a LR mode transmission. Accordingly, communication mode parameter setting module 418 determines, based on its selection logic and on the prevailing circumstances, which parameter values to apply to a current transmission.

Figure 6A:
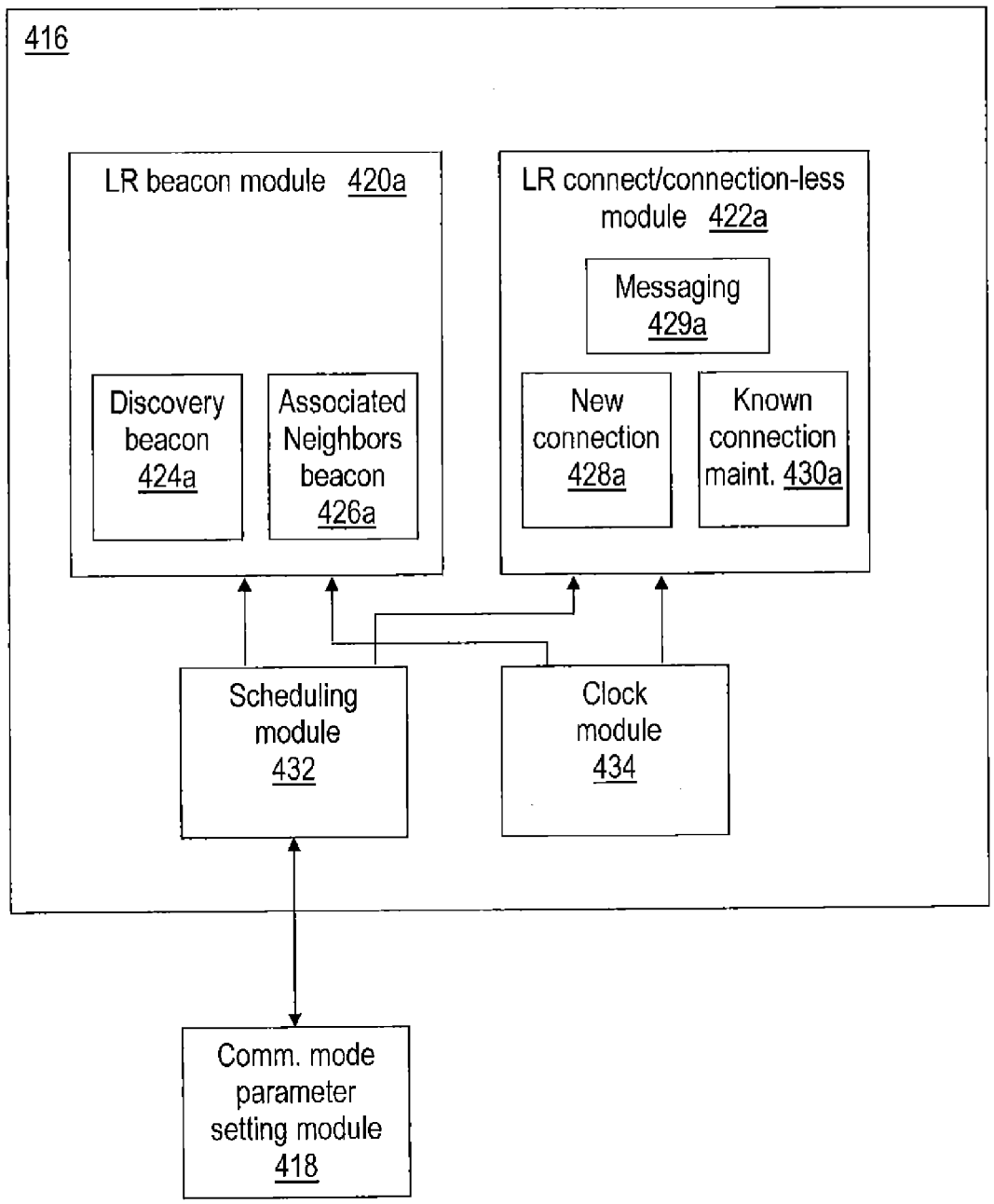
FIG. 6A is a block diagram illustrating an exemplary structure of modules implementing the LR mode as part of the communications mode control module of the embodiment of FIG. 5, according to one embodiment of the invention.

FIG. 6A is a block diagram illustrating an exemplary structure of LR mode modules that make up communications mode control module 416 according to one embodiment. Communications mode control module conducts two types of operations: beacon operations, and connection/connection-less data communications operations. As will be described in greater detail below, these two types operations are time-multiplexed according to a schedule (with the schedule being dynamically variable according to the prevailing circumstances in the node device's neighborhood according to one embodiment). In general, discovery beacon messages are broadcast at a variable interval to identify the presence of node device 100a to neighboring nodes. Associated-neighbor beacons are sent out more frequently to support associated neighbor synchronization and provide low-latency periodic connection establishment access opportunities when a node has associated 'child' node neighbors that use the parent for access to the network using LR mode. In one type of embodiment, which is described in greater detail below, each beacon message is associated with a transmission frame structure in which a series of receive time slots follow the beacon message transmission (see FIG. 14). During the receive time slots, the node device that transmitted the beacon listens for connection request messages sent by neighboring nodes in response to the beacon message, to initiate communications. The connection request messages are part of the connection operations. The receive slots may also be used by neighbors to send connection-less data messages to the node transmitting the beacon.

Figure 6B:
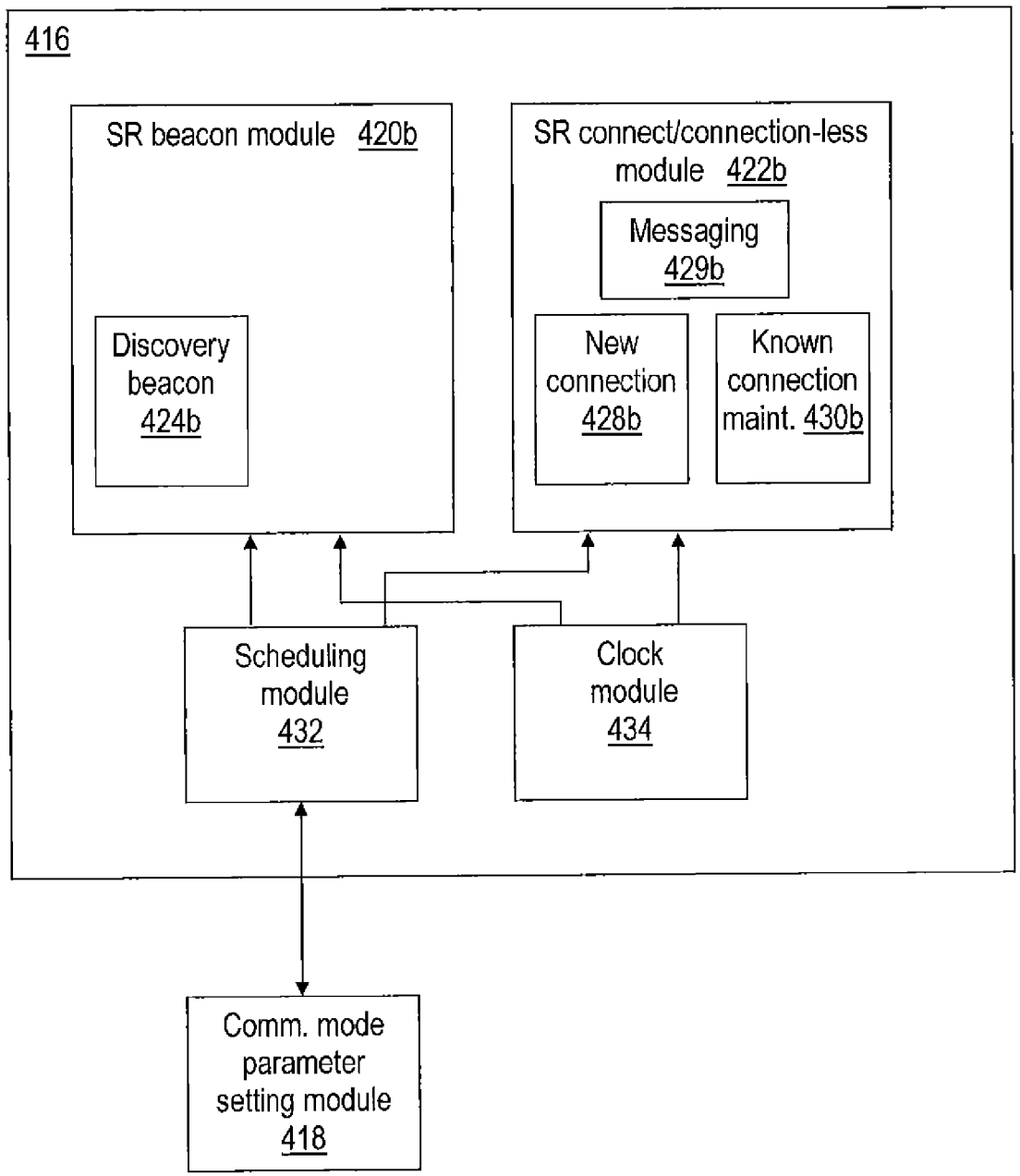
FIG. 6B is a block diagram illustrating an exemplary structure of modules implementing the SR mode as part of the communications mode control module of the embodiment of FIG. 5, according to one embodiment of the invention.

FIG. 6B is a block diagram illustrating an exemplary structure of the SR mode modules that make up communications mode control module 416 according to one embodiment. Communications mode control module conducts two types of operations: beacon operations, and connection/connection-less data communications operations. In the case of SR mode associated neighbors can initiate connections without the need for a dedicated Associated-neighbor access beacon/synchronization transmission.

Beacon operations are handled by SR beacon module 420a and LR beacon module 420b, for SR communication mode and LR communication mode, respectively. Connection-oriented and connection-less operations are handled for SR and LR communication modes, respectively, by SR connect/connection-less module 422a and LR connect/connection-less module 422b. Each of the beacon modules 420a, 402b has a corresponding discovery beacon module 424, while the LR mode also includes the associated-neighbor beacon module 426 for synchronization and ensuring faster connection and message transfer access when there are known, associated LR mode neighbors. Each discovery beacon module 424 defines functionality facilitating discovering (or being found by) neighboring nodes. This can include transmission of advertising messages, such as beacons, on a dedicated control channel or across multiple frequency channels (in the case of SR, FHSS mode) at a defined repetition rate. In one embodiment, the repetition rate is dynamically variable, but is always set to a minimal, nonzero, rate, meaning there is some minimum new neighbor finder beacon activity, even in the presence of numerous established neighbors. In other embodiments, the repetition rate is fixed at a configured rate, which can be varied via a configuration process, but is otherwise not automatically adjusted in the absence of a specific adjustment command.

Each LR mode associated-neighbor beacon module 426 facilitates establishing communications with the already-established (i.e., known) LR mode neighboring nodes of node device 100a. This functionality includes broadcasting beacons according to the defined frequency hopping schedule, at a dynamically-determined repetition rate that is greater than the repetition rate of the discovery beacons sent by the discovery beacon module 424 whenever the transmitting node has associated 'child' node neighbors. If there are no associated 'child' neighbors only the discovery beacon may be transmitted.

Although for LR mode the beacons sent by the discovery beacon module 424a and associated-neighbor module 426a may have different packet structures and data formats in various embodiments, in one particular example embodiment, the general packet structure and message format are the same.

Each of the SR and LR connect/connection-less modules 422a, 422b includes a connection module 428 and a connection-less module 430. LR mode connection module 428b monitors the control channel beacons of its parent or its own associated-neighbor beacon requests, and establishes connections with neighbors that are new (i.e., not present on the node device's list of neighbors) or known and already having existing neighbor associations. Connection-less module 430 facilitates transmission and reception of messages from new or known neighbors.

In one embodiment, the LR mode beacon operations are performed by node devices operating in their capacity as parent nodes, or potential parent nodes, and the connect operations (responsive to received beacon messages) are performed by the node devices when operating in their capacity as child nodes. According to this approach, a child node that has a message to be transmitted toward the gateway waits for a beacon message from its parent before a connection can be established. In another type of embodiment, beacon messages are sent by node devices that have a message ready to be transmitted, in one of either LR or SR mode regardless of their relative hierarchy to gateway devices.

In one embodiment, the following operations are handled by communications mode control module 416:

- SR communication mode, beacon operation, new neighbor;
- SR communication mode, beacon operation, existing/known neighbor;
- SR communication mode, connect operation, new neighbor;
- SR communication mode, connect operation, service existing/known neighbor;
- SR communication mode, connection-less operation;
- LR communication mode, beacon operation, new neighbor;
- LR communication mode, beacon operation, existing/known neighbor;
- LR communication mode, beacon operation, connect operation, new neighbor;
- LR communication mode, beacon operation, connect operation, existing/known neighbor; and
- LR communication mode, beacon operation, connection-less operation.

According to certain aspects of the invention, these operation modes are time-multiplexed in node device 100*a*. Scheduling module 432 defines when, and if, each of the operations is to be activated, and can further define the schedule of tasks that are part of each of the operations to be carried out. Clock module 434 provides a time reference to the so that the operation schedule defined by scheduling module 432 can be followed.

Scheduling module 432 exchanges information with communication mode parameter setting module 418. Based in this exchange, the scheduling among the various operations and their constituent tasks is varied. Inputs that affect the parameter setting include the neighbor table, the recent history of communications with neighbors, application requirements, and the like. A variety of combinations of factors including these, and other, inputs, are contemplated in various embodiments for adjusting the schedule. For example, if node device 100*a* has a relatively larger number of children, it may be beneficial for the sake of improving overall data throughput in the neighborhood to have node device 100*a* spend a greater share of time in beacon operation, existing neighbor operations so that a greater number of child nodes can be serviced in a given operation cycle.

According to various embodiments, the SR and LR communication modes are administered according to different protocols. For instance, in network neighborhoods where the node devices have already established relationships with their neighbors, a node device operating in the SR communication mode that has a message to send simply can broadcasts message connection request, and re-broadcasts the request until an acknowledgement is received from the neighbor device for which the message was intended. The re-broadcasting can follow the established FHSS channel sequencing. This type of SR communications protocol can be used in embodiments where there is sufficient channel capacity and operational capability of the node devices to re-transmit messages on the one side, and to listen for messages on the other side, with sufficient periodicity, such that messages can be communicated within acceptable communication performance limits. In this embodiment, the SR beacons and connections in response to the SR beacons are used to find and establish connectivity to new neighbors, but not for routine communications with known neighbors. In related embodiments, the LR communication mode is used less frequently, such that communications can be established only through a beacon-response protocol, even with known neighbors.

According to one aspect of the invention, each node device independently determines its scheduling of operations in each of the communication modes. Taken collectively, all of the node devices in a neighborhood, and indeed, in the network, achieve a self-organizing multi-hop network that does not require a centralized system coordinator. As part of the independent determination of communication mode operations, each node device selects a communication mode from among the SR and LR modes for connecting to a neighboring node or to make itself available to receive from an existing or potentially new neighbor. Different circumstances can give rise to different selections of SR/LR communication mode operation ratios, even when connecting to the same neighboring device. In one embodiment, selection of communication mode is based on a regular re-assessment of the available neighboring nodes that can be parent nodes, the data throughput available to the nearest gateway device through each of the potential parent nodes (which itself can be a function of link quality, neighboring node performance, and other such factors), and application requirements (such as preferences as to communication latency versus data throughput for a particular service).

According to one embodiment, each dual-mode node device provides beacon operation in both communication modes, SR, and LR. In a related embodiment, the ratio of SR-LR beacon operation is independently varied by each node device according to the prevailing circumstances. In one example, for a given node device, the ratio of LR to SR beacons can be automatically varied between 0.01:1 and 1:0.01.

The circumstances according to which the SR-LR operations can be varied for beacon transmission operations can include whether the node device has any child nodes that connect to it via LR mode, how many of such child devices there are. In a related embodiment, the history of LR connections with any of these child devices is also considered, including such statistics as how often the child devices establish connections in response to the LR beacons, the amount of data transmitted by each of the child devices, and the like. These circumstances provide indicia of the relative necessity for supporting the LR mode.

In one embodiment, the existence of even a single child device connecting via LR mode will cause the parent node device to perform the LR associated-neighbor beacon operation to service existing neighbors. Frequent communications via LR mode, as established by the one or more child nodes in response to the LR beacons sent by the patent node, or relatively greater amounts of data (each of which can be assessed based on thresholds or on predefined formulas) are indicators of the need to expand the LR beacon duty cycle to better support the LR child node(s). Also, the use of certain applications that rely on low-latency connections over LR mode may call for increased transmission of LR beacons.

A lack of child nodes utilizing the LR mode may be responded to by only performing the LR discovery beacon operation, which has a substantially less frequent beacon interval to free up more time for SR communications, save energy, and keep the channel clear for other node devices using the communication band.

In one embodiment, the discovery beacon operation differs from the associated-neighbor beacon operation in that the operation involves substantially more frequent beacon transmissions so that the node is available to its known, existing associated neighbors with low latency high availability. In a related embodiment, the LR mode discovery beacon operation is assigned to a single frequency. For example, the discovery beacon can be assigned to a particular control channel of a set of channels, rather than using all of the available channels in the ISM band in which the node devices operate. In another related embodiment, even when a node services child nodes, it maintains its discovery beacon operation so that new prospective child nodes can more readily receive the find new neighbor beacon by virtue of knowing to monitor the control channel.

Figure 7:
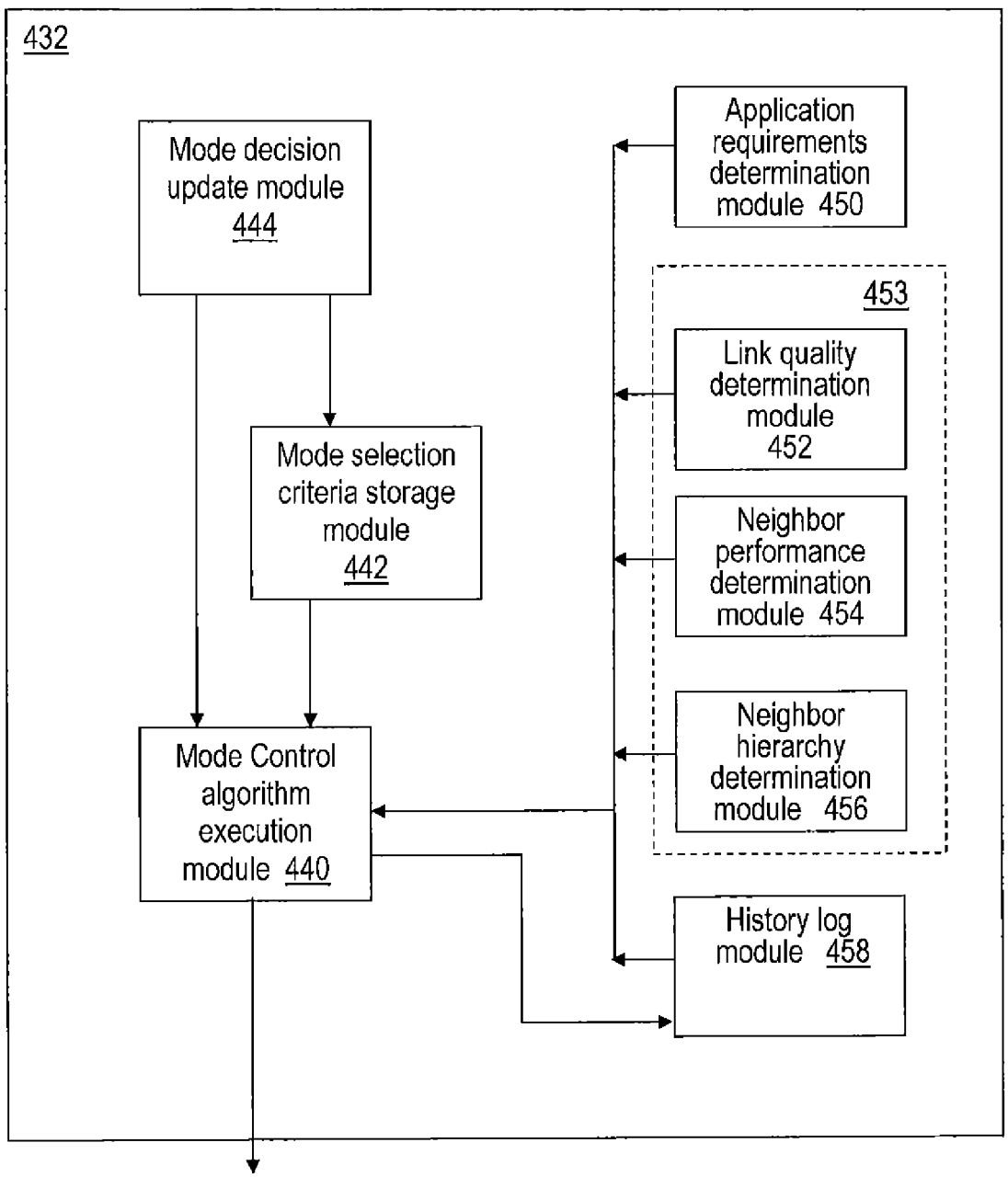
FIG. 7 is a block diagram illustrating an exemplary structure of modules that make up a scheduler module of the communication mode control module of FIG. 6, according to one embodiment.

FIG. 7 is a diagram illustrating the modules facilitating an exemplary portion of the functionality of scheduling module 432, which portion is responsible for selecting whether to connect to or send connection-less messages to a neighboring node via SR connect module 422a or LR connect module 422b. For an existing neighbor the mode decision may be directly based on the stored neighbor management data (from module 419). The mode used for a connection to the neighbor is also influenced by the need to evaluate link and network path performance using alternative connection modes. Mode control algorithm execution module 440 applies a predefined decision algorithm to determine the communications mode that is to be used, and provides an output to TX mode select input module 236 and to SR comment module 422a and LR connect module 422b. The decision algorithm is defined by mode selection criteria, which in turn is maintained by mode selection criteria storage module 442. Mode decision update module 444 receives criteria update or algorithm execution update information, which may be inputted from a transmission by a system administrator via radio communications, or from a field configuration device through a local communication port.

In the embodiment depicted in FIG. 7, mode control algorithm execution module 440 additionally bases the communication mode selection on various inputs that provide information about the prevailing circumstances including neighbor connectivity and the need to detect or update information on the existence of nodes within the neighbor environment. Mode control may apply in the context of connecting to or attempting to connect to send data to a neighbor. Mode selection is also made in the context of a node's idle mode status when it is available to support communications, in either mode, with its various node neighbors. Application requirements determination module 450 reads control-related instructions in messages received, or to be transmitted, to determine the preferred, or required, communications operability to serve the application layer functionality. For example, one type of application layer requirement can call for the lowest possible latency for delivering relatively small amounts of data. This requirement may be associated with alarm messages, for instance. Accordingly, mode control algorithm execution module 440 would select the LR communication mode preferentially.

In another example that calls for the use of the LR communication mode, a geographic location-determining application that measures indicia of distance between node devices based on received signal strength or message transmission delay benefits from the LR communications mode, which have an improved ability to directly reach, in a single hop, to specialized reference nodes that may support a position-determination or time synchronization application.

In a related embodiment, the selection of communication mode is based on the effectiveness, or communications path performance, of neighboring node devices through which communications are routed. In accordance with this approach, link quality determination module 452 assesses the performance of the communication link with a given neighbor. A variety of link quality performance measures may be suitable. For example, expected transmission count (ETX), average data throughput rate, received signal strength (RSSI), and the like, may be employed. Performance measures may represented not just the immediate neighbor link but potentially the path performance to a given destination such as the GW. Neighbor performance determination module 454 assesses other factors affecting the communications performance of a neighbor, such as measures of relating to latency (e.g., beacon intervals, connectivity periodicity, etc.). This type of information may be obtainable from a communication log that stores measures of performance for past communications, or from the routing table stored locally on each node device, which is built and updated continuously as part of the routing determination operations carried out by the network layer.

Neighbors may also exchange relevant performance information, such as indicators of loading of the communications overhead. For example, if a node device has many child nodes that it services, it may have relatively less time to devote to any one child to facilitate communications to the gateway node. In one embodiment, an aggregate communication performance measurement is provided by data throughput determination module 453. This module can provide an indication of the overall data throughput to the gateway node, for example, over a defined monitoring time window, that is available for each parent node device. According to one embodiment, a uniform performance metric is adopted across the network of node devices to enable a standardized set criteria for communications performance.

Neighbor hierarchy determination module 456 ascertains the network location, or multi-hop level, of each neighboring node relative to the gateway device. The network location in this case can be represented in terms of number of hops needed by that neighbor to reach the gateway. This information is indicative of whether a given neighbor node is a potential parent node. In a related embodiment, the communication mode that is currently being used by the neighbor device, SR or LR, can also be determined. Depending on the criteria used for mode selection and on the present needs by a certain application, neighbor hierarchy determination module 456 can provide essential information on the prevailing network conditions to enable more sophisticated decision criteria to be used. For instance, in an embodiment that determines a communication mode by weighing factors relating to data bandwidth on the one hand and latency on the other, the neighbor hierarchy knowledge can help to inform the mode selection decision by providing insight into the speed or delay performance of each neighbor node.

Neighbor hierarchy determination module 456 can obtain such information from the networking module 404, the routing table management module 414, or via interrogation of each of the neighbor devices using control messaging, for example. The determined network location can be another factor that is taken into account by mode control algorithm execution module 440 to make the communication mode selection. As depicted, data throughput determination module 435 can use a throughput metric that is sensitive to the neighbor hierarchy, making a separate hierarchy determination redundant in some embodiments.

History log module 458 maintains information on previous connections made with each neighbor node, and the performance of those connections. This information can also be taken into account by mode control algorithm execution module 440. The history log can include such items as SR/LR connection mode, data throughput achieved for previous connections, and the like. History log module 458 can also provide statistical aggregations, such as mean values, median values, variances, etc. The module will receive input data from the neighbor management module 419.

Figure 8:
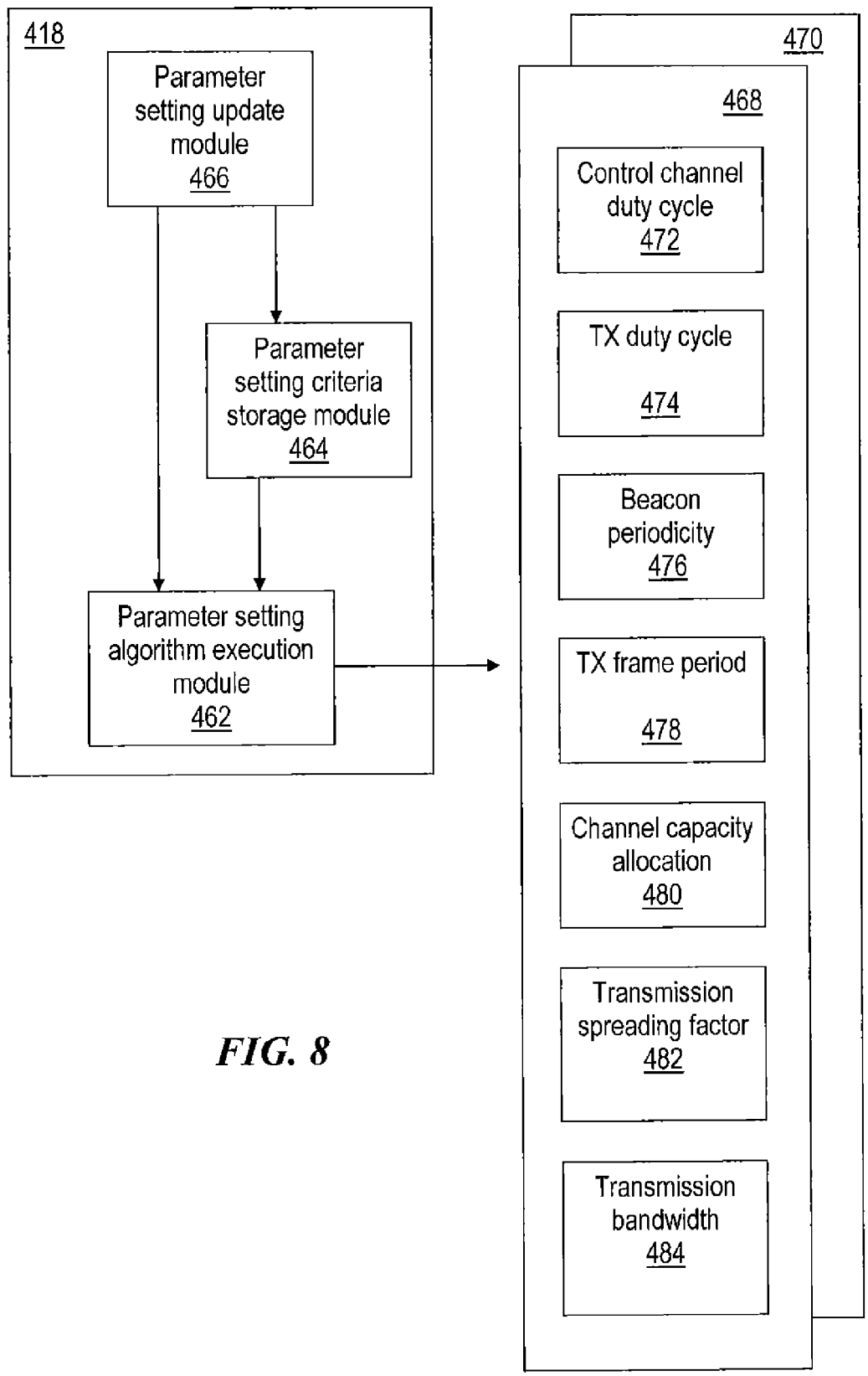
FIG. 8 is a block diagram illustrating an exemplary structure of modules that make up the communications mode parameter setting module of the embodiment of FIG. 5, according to one embodiment of the invention.

Turning now to FIG. 8, an exemplary structure of modules that make up the communications mode parameter setting module 418 is depicted according to one embodiment. The actual setting of communication parameters is performed by parameter setting execution module 462. This module applies criteria in making the decision, which is maintained by parameter setting criteria storage module 464. Parameter setting update module 466 receives parameter setting criteria update or algorithm execution update information, which may be inputted from a factory configuration, from a transmission by a system administrator via radio communications broadcast messages, or from a field configuration device through a local communication port.

In the embodiment depicted, parameter setting algorithm execution module 418 sets one or more of the following parameters for each of the communication modes, LR mode 468 and SR mode 470: control channel duty cycle 472; transmission duty cycle 474, beacon periodicity 476, transmission frame period 478, channel capacity allocation 480, transmission spreading factor 482, and transmission bandwidth 484. In a related embodiment, the SR communication mode 470 has fixed values for certain ones of the parameters that are varied for the LR communication mode 468. In an alternative embodiment, there are certain parameters that are adjusted in the SR communication mode that are not adjustable in the LR communication mode.

According to one type of embodiment, the communication mode parameters are set based on the requirements indicated by the beacon received from the neighboring node to which a connection is to be established. As will be described in greater detail below, using a common, pre-defined transmission setting, one or more variable parameters may be dictated by the beacon-sending node, to which the responding node must adjust in order to establish communications. In this type of embodiment, parameter setting execution module 462 of the beacon-sending node applies a parameter setting algorithm to define the communication parameter for at least the LR communication mode. In conjunction with a dedicated connection establishment, the parameters can be set differently for use with each of its child nodes. Common parameters can be set based on one or more factors including, but not limited to, the number of child nodes that the node device services, communication performance measured for communications with parent or child nodes based on recent history, communication channel availability, the density of node devices in the local vicinity, etc.

In one embodiment, the communication parameters to be used are included as part of a synchronization message content sequence in the header of the beacon frame. In another embodiment, this information is included elsewhere in the beacon frame, such as in a specially-defined field of the message payload portion of the frame. In response to receiving such a beacon, the receiving node decodes the parameter information, and parameter setting execution module 462 of the receiving node adjusts its parameters to match the parameters specified in the beacon for subsequent connection-less or dedicate connection assignments.

In a related embodiment, a plurality of parameter values are represented by a single string or numeric value incorporated into the beacon. This string or numeric value is termed a frame parameter (FP). The receiving node is programmed to derive the plurality of parameter values according to a predefined decoding sequence. In one example, a lookup table is maintained by parameter setting execution module 462 of each node device, which defines various combinations of parameter values corresponding to different FP values. In another embodiment, one or more formulas are applied to generate the FP value from the plurality of parameter values, and to derive the parameter values from the FP value as the reverse operation. It should be understood that, in various embodiments, there may be one FP that defines all of the variable parameter values, or there may be more than one FP value, each of which defines one, or a plurality, of parameter values.

Figure 9:
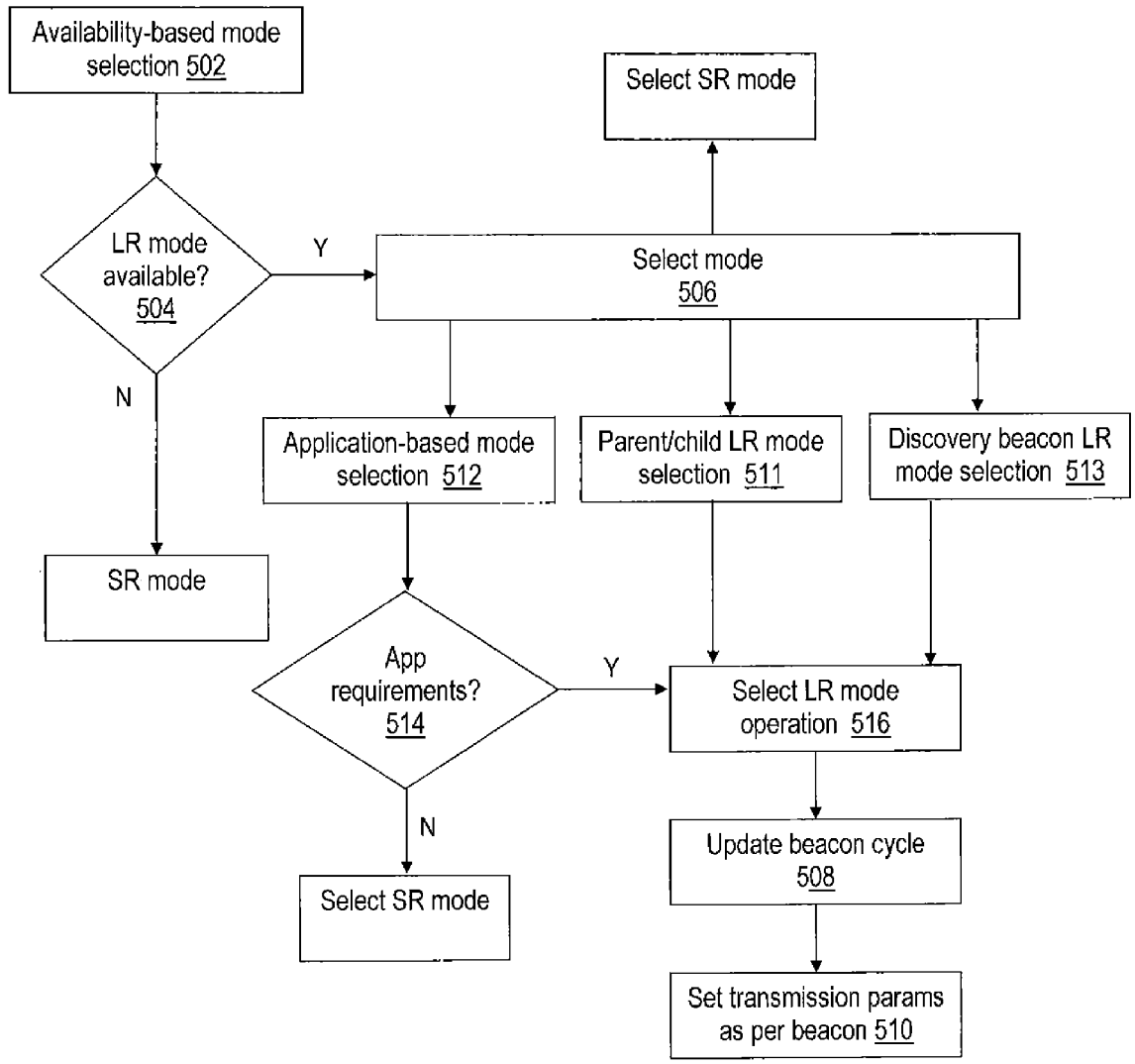
FIG. 9 is a flow diagram illustrating a process of autonomously selecting a communications mode, to be carried out by a multi-modal node device, based on availability, application, and performance criteria, according to an embodiment.

FIG. 9 is a flow diagram illustrating an exemplary algorithm, at a high-level, for making LR communication mode selection in connecting to a node for which neighbor connectivity did not previously exist, according to one embodiment. At 502, an availability-based mode selection is initiated. This operation involves determining whether SR or LR mode is supported. At 504, it is determined whether any of the two modes are not available. Accordingly, the available mode is selected for LR mode communications at 506. At 508, once the LR Mode is selected, the beacon listening cycle is updated to match the periodicity of the beacons of the communication mode. The beacon periodicity can be provided within the beacon using a FP value, as a dedicated field, or as a tagged value within the payload of the beacon. At 510, the transmission parameters are updated to match the communication parameters specified for the beacon.

Where both communication modes are available, the process proceeds to 512, where an application-based communication mode selection may be initiated. The nature of the communication to be transmitted can dictate one or another of the communication modes. At 514, it is determined whether there are application requirements for a particular communication mode. If that is the case, at 516 the application-specific LR communication mode is selected. Otherwise, the process proceeds to performance-based communication mode selection at 522.

Figure 10:
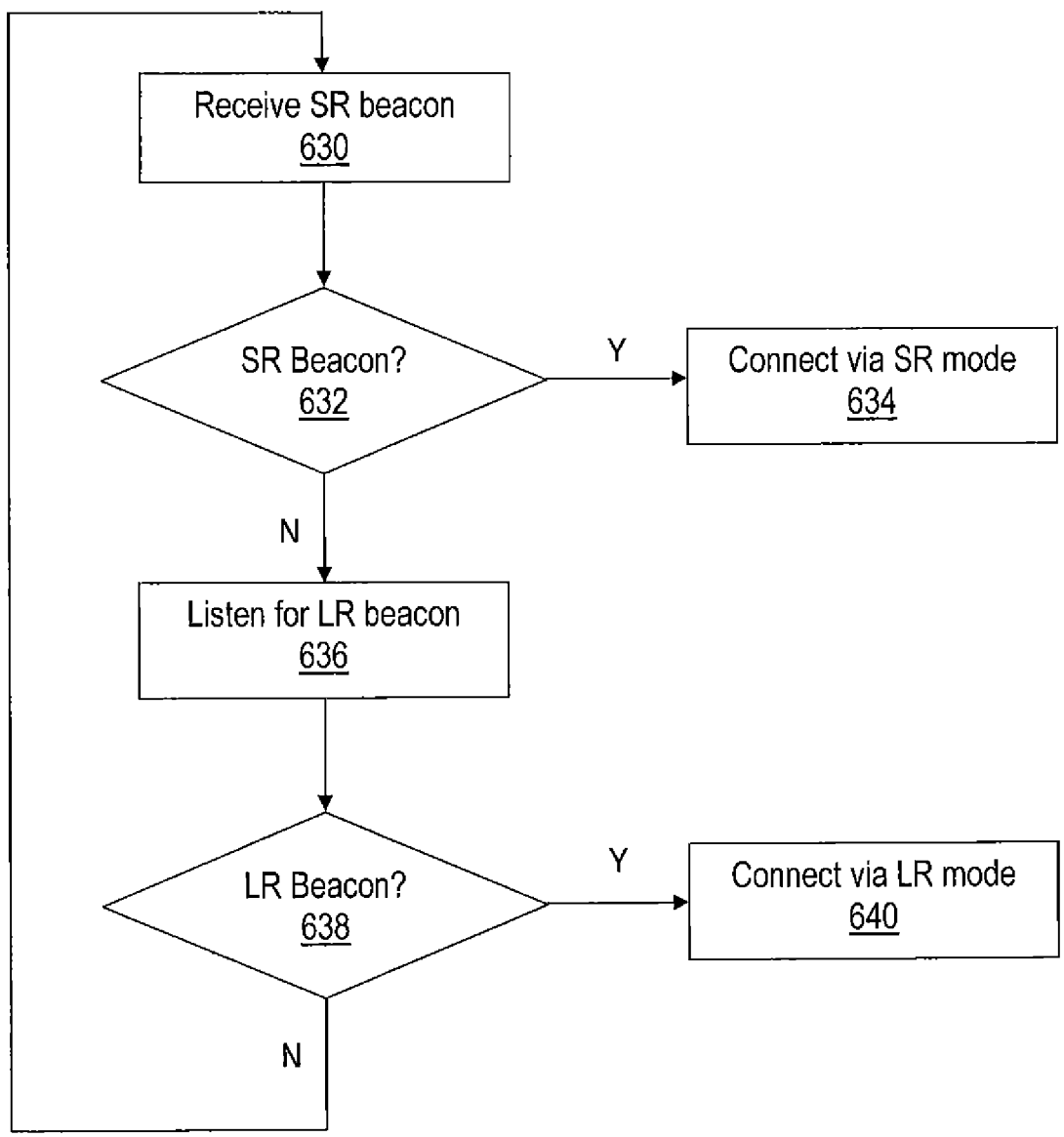
FIG. 10 is a flow diagram illustrating a process for selecting a communications mode based on a preference for using short-range, high-data rate communications, according to an embodiment.

FIG. 10 illustrates the alternating mode selection of a dual-mode node attempting to find initial access connectivity to the network. The scheduling for moving from one mode to the next is under the control applied via the transmission/reception input module 236. In this approach, there is a bias for selecting the SR mode to take advantage of its higher data rate capability. At 630, the node device listens for a SR beacon using a SR receive mode. At 632, it is determined if the SR beacon was received. In the affirmative case, a selection is made to use the SR mode to make the connection. Otherwise, at 636, the node device listens for the LR beacon using its LR receive mode. If, at 638, a LR beacon is not detected after a predefined time period, the process repeats to provide further opportunity to connect via SR mode. If the LR beacon is received, the LR connection is made at 640.

Figure 11:
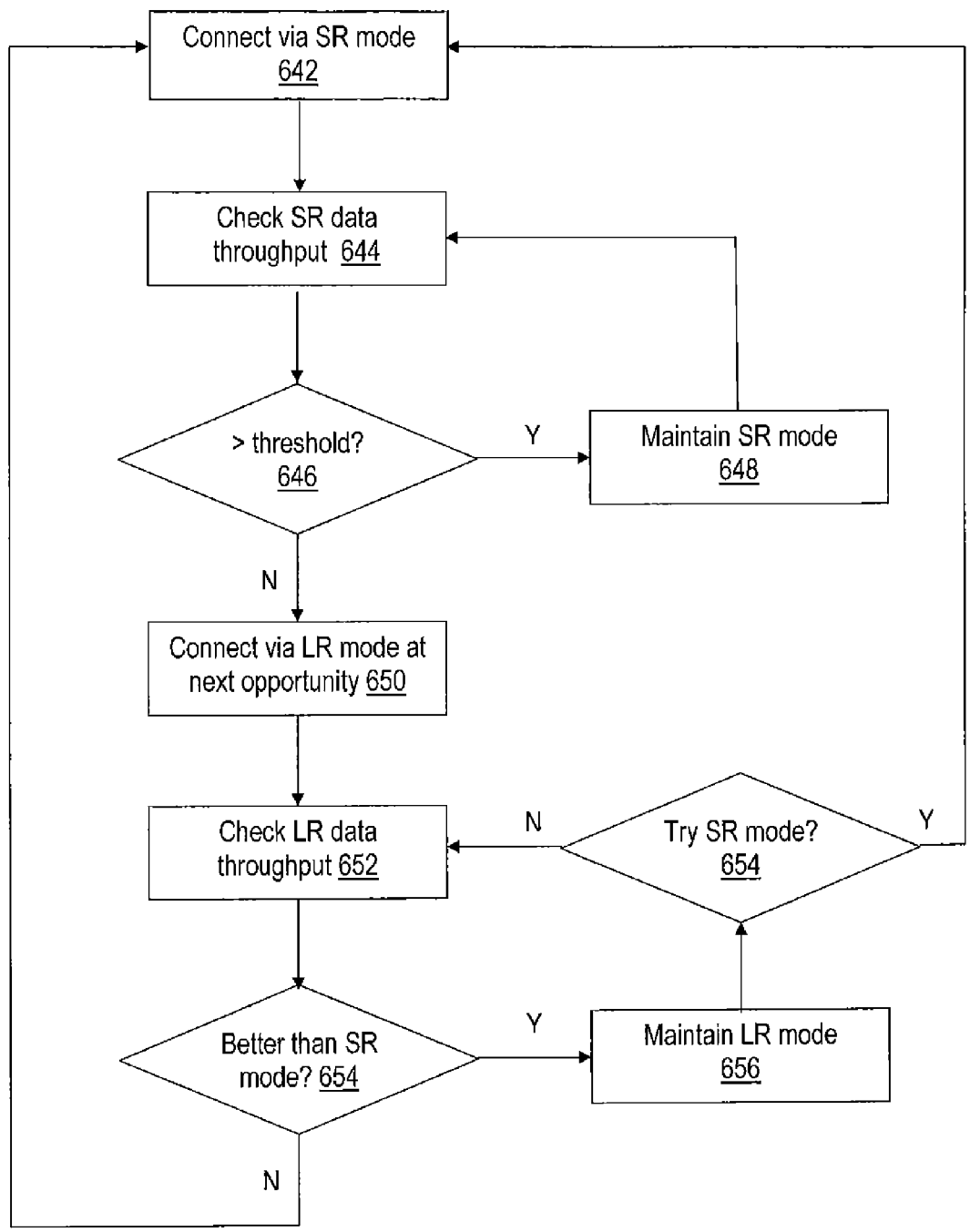
FIG. 11 is a flow diagram illustrating a process for selecting a communications mode based on performance criteria, according to an embodiment.

FIG. 11 illustrates an exemplary process for selecting the communication mode, when evaluating network connectivity through a given existing/known neighbor, based on performance criteria according to one embodiment. At 642, a connection is made according to the assumed current preferential SR mode. At 644, the data throughput is monitored for this mode using one or more performance measures. At 646 the SR performance is compared against a threshold. This threshold may be defined, for example, as the best possible LR throughput level. In this case, a throughput level that is below the threshold indicates the possibility that another parent node device, which may be available via the LR communications mode, might perform better. If the SR performance level is above the threshold, SR mode is maintained at 648, and the process loops back to monitoring the throughput performance in subsequent future connections (used for message data transmission of established specifically for link/path performance evaluation). Otherwise, if the threshold performance level is not attained, the node device will connect to the neighbor via LR mode at the next opportunity at 650.

At 652 the LR data throughput is checked and a comparison is made at 654 as to whether the LR throughput is better or worse than the SR throughput. If the SR mode performed better, the process loops back to connecting via the SR mode. If the LR mode is better than the previously-measured SR performance, then the LR mode is maintained for some predetermined amount of time, communication cycles, or until some triggering event occurs at which point the process determines that the SR mode is worth trying again, as depicted at decision 654. One example of a triggering event other than time lapse or communication cycle count is if the received signal strength (RSSI) of a received, alternative neighbor LR beacon is significantly improved and/or offering a higher performance connectivity path relative to the current network connection. If it is time to try the SR mode again and/or a new SR mode neighbor is detected, the process loops to 642 to reconnect via the SR mode.

Figure 12A:
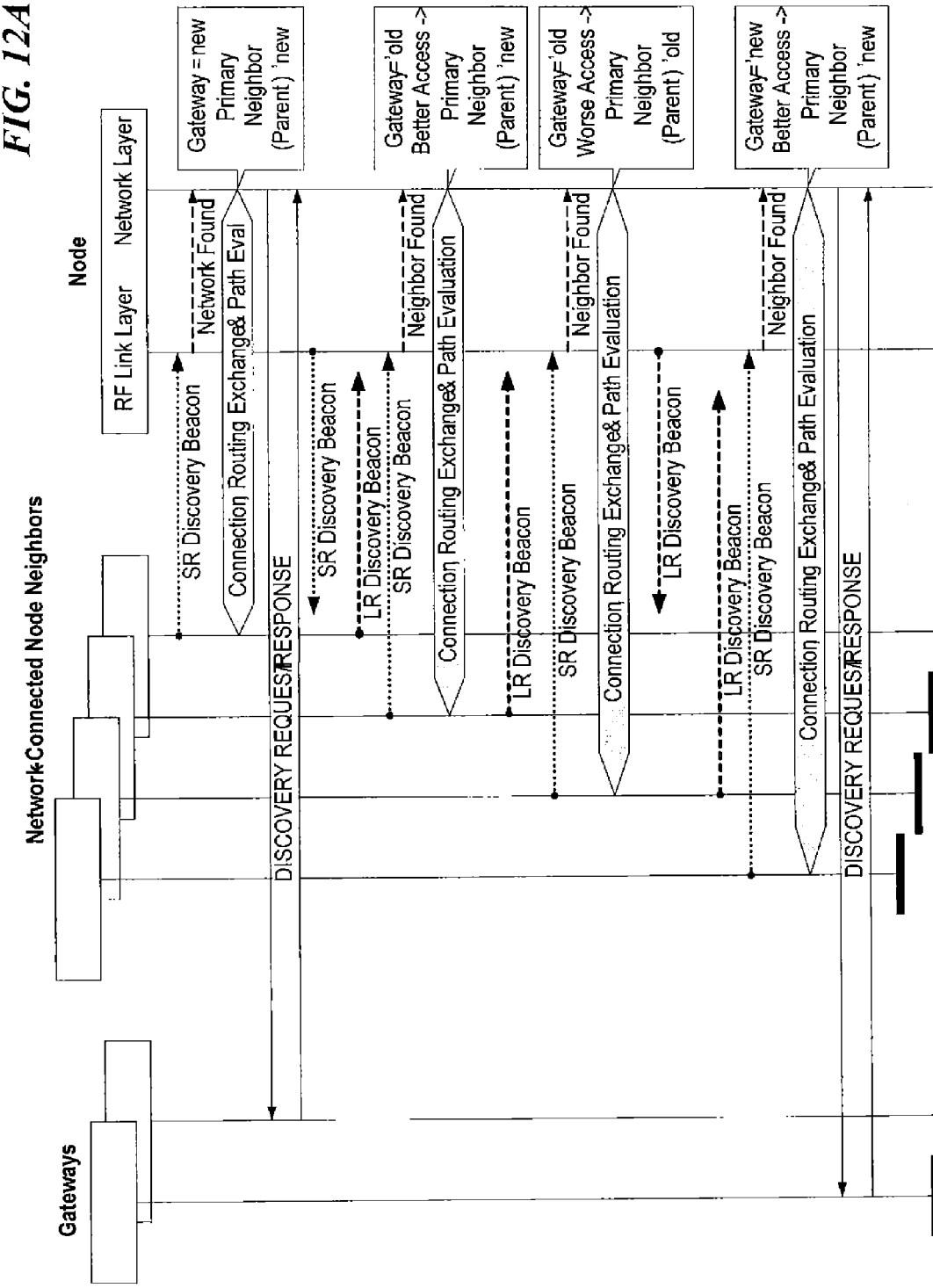

FIGS. 12A and 12B illustrate various communication exchanges between a node device and its neighbors in greater detail according to embodiments of the invention. These examples illustrate a mechanism for categorizing new and existing neighbor associations according to the communication mode selected for communications with the particular neighbor. According to one embodiment, each node device assigns a neighbor class of either "primary" or "secondary" for its neighbor nodes. This classification can be factored in to the frequency of scheduling connections for selection algorithm evaluation for the communications mode to the particular neighbor.

According to one embodiment, initially, to join the network upon power up a node device enters a frequency scanning receive operation in which it will camp (i.e., passively receive transmissions) on a given system frequency. During this SR receive phase the node listens for SR beacons being transmitted by neighbors that are already joined to the network. In this embodiment, only those nodes that are already joined to the network will transmit very low duty cycle periodic SR beacons (repeated on all operating frequencies in each beacon transmission cycle). The SR beacons carry node-identifying information as well as network-specific operating and potential routing-related information.

The joining node remains in the receive operation and will shift from one frequency channel to the next while remaining in the SR receive mode and continuing to listen for transmitted SR beacons. To provide resilience against interference on any single channel or channels, the node can shift from one frequency to the next frequency channel across the set defined for the network after a preconfigured receive period on each frequency. The sequence of frequencies on which the node progressively camps to receive a SR beacon may be random or otherwise system-defined. The node continues to cycle in the SR mode receive operation from one frequency to the next until all of the operating spectrum frequencies are covered and will continue to operate in this state over multiple iterations of the entire frequency spectrum of available channels.

In one example embodiment, the duration of the SR receive phase is equal to a multiple of the maximum period between SR mode discovery beacons for connected nodes, or a system-specified time period. If at any time during the receive scanning an SR mode discovery beacon is received, the node will schedule a connection to the identified neighbor and will attempt to initiate network joining in SR mode.

Once the complete SR receive operation is completed and if no SR beacons have been received, the node device switches to LR mode. In the LR mode reception operation, the node performs a similar cycle of camping on a single frequency, at a defined default spreading factor (SF), for a defined duration before changing to the next frequency. This is similarly repeated across a set of defined control channel frequencies or across the entire operating system frequency spectrum. At each frequency, the node device listens in LR mode for beacons transmitted from any neighbor node that already has network connectivity.

In a related embodiment, the LR-mode frequency scanning is additionally performed over various channel bandwidths pre-defined for the system and across all of the possible frequency channels associated with each of the particular channel bandwidths. In addition, the LR mode receive scanning can be performed for various spreading factors defined for the system. In another related embodiment, the time spent camped on each frequency channel can be variably based on the maximum beacon interval with which nodes that have network connectivity are programmed to generate a LR mode beacon on a single channel. Preferably, the camping time at least exceeds this maximum periodicity. Alternatively, the time duration per frequency channel may be fixed.

If at any time during the receive scanning a LR mode beacon is received, the node device responds by initiating a connection to the identified neighbor and attempts to initiate network joining in LR mode. If, after the series of LR mode frequency channel and spreading factor reception scanning cycles that exhausts the full range of possible channels, channel bandwidths, and spreading factors, a LR mode beacon is not received, the node returns to the SR mode reception scanning phase.

In this embodiment, after returning to the SR receive mode the node will continue in the SR scanning phase for another full cycle duration. Once the full SR receive mode scanning period is reached, if no SR discovery beacons have been received the node will again switch to LR mode channel reception.

A mains-powered node device will continue to alternate between full cycle periods of SR mode receive scanning and LR mode receive scanning until the beacon of a neighbor is found in either SR or LR mode that allows the node to initiate connectivity to the network. A battery-powered node device will, after a defined number of alternating phase periods in each SR and LR reception scanning modes, return to its sleep mode for some predefined extended period during which it will no longer maintain active reception. This will allow the battery-powered node to preserve available battery life.

As illustrated in FIG. 12A, an exemplary set of communications exchanges for a node initially joining the mesh network is depicted. Based on the passive-join approach described above, the dual-mode node device initiates system access in the high-data-rate SR mode to attempt to discover neighboring nodes (or Gateways) already connected to the network. Node neighbors already connected to the network indicate their connectivity and availability by transmitting periodic, low duty cycle discovery beacons, such as those described above. In this embodiment, dual-mode nodes broadcast both SR and LR mode beacons while single-mode nodes broadcast a beacon in their single operating mode. The duty cycles of the discovery beacons can be as infrequent less than 0.1% of a node's operation and can be varied according to the communication mode and the node's self-discovered neighborhood density.

As depicted in FIG. 12A, the new joining node begins scanning for SR mode beacons. Upon discovery of a neighbor the node schedules a connection to the neighbor. That connection is used to perform a network access routing exchange and to further evaluate the RF link quality to the neighbor as well as confirm other network access/control information that may have been derived from the discovery beacons. Based on the link connection and routing exchange the new node is able to establish network access using the neighbor node as a parent for connectivity to the network. Network access is established via the gateway device through which the neighbor (parent) node is currently connected. The new joining node will at this point initiate a discovery exchange with the identified network gateway to register its presence in the network, to complete system security access/authentication, and to obtain any dynamically-assigned network address information. Application service information related to devices (such as sensors or meters in the case of an AMI network) that may be associated with the node may also be registered to the application network server(s) via the new serving Gateway.

Once connected to the network, the new node schedules and begins to transmit its own periodic, low-duty-cycle discovery beacon, to be broadcast in both SR and LR modes where the node is so capable. The joining node also continues to monitor for other connected neighbors that may provide SR discovery beacon broadcasts. As each new neighbor is found, the newly-joining node schedules a connection for purposes of assessing whether the discovered neighbor can provide better network access connectivity. Because the newly-connected node itself broadcasts discovery beacons, its presence may also be observed by a neighbor who may initiate the neighbor connection (not shown). As part of building potential diversity for network connectivity as well as service access, the new node will also initiate the process of performing low duty cycle background LR mode scanning for discovery of LR supporting neighbors that may provide alternate network connectivity should the quality of established SR mode connectivity degrade or be lost entirely.

As illustrated in FIG. 12A, the already-connected neighbors as well as the newly joined node, even while connected to the network in SR mode will continue to transmit periodic LR beacons. This operation allows new nodes that are unable to connect to the network via the preferential higher-data-rate SR mode to discover node neighbors using the LR mode. It will also facilitate identification of LR mode application-specific availability. In the illustrated example, the newly-joined node with available SR connectivity does not initiate LR mode network connections to discovered neighbors. However, as described above, there may be a situation in which all available SR more connectivity performance drops below a threshold, necessitating LR mode connectivity.

For each discovered neighbor, the joined node device assesses the information provided in their discovery or associated-neighbor beacons and, where appropriate (based on the information broadcast), establishes a connection for routing exchange and further network path cost evaluation. In this embodiment, the link performance assessment and evaluation of the connectivity path to a serving Gateway are central to the performance evaluation that a node carries out in deciding which neighbor and, ultimately, which communication mode to select in connecting to the network.

In a related embodiment, the path selection performance assessment is primarily measured by the effective throughput of the associated full connection path to a serving gateway. Even if the evaluated neighbor does not offer a better access path into the network, the neighbor information may still be maintained for potential future diversity or service-based connection access. If the discovered neighbor does not offer a better access path no change is made to the node's current parent and associated gateway connectivity into the network.

On the other hand, if a better access path is provided through a newly discovered neighbor (based on the applied path selection criteria), the node device updates its network connectivity by changing to the new parent node. If the new parent is associated with a gateway different from the one to which the node was previously associated, an explicit discovery update is also made to the new network gateway to which the node has just attached.

A node device, once connected to the network, will continue to discover and evaluate node neighbors in SR and LR mode (including evaluations that are performed without the need for a dedicated connection establishment). The node will update its connectivity by selecting and associating to any node neighbor where the local link connection to the neighbor as well as the offered network path to a serving gateway improves connectivity based on, for example, the routing and network-defined path selection criteria based on the throughput metric. By observing periodic broadcast beacon information and performing targeted neighbor connection link assessments, a node device will continue to maintain and update its optimal connectivity path to the network. Accordingly, in cases where the primary RF link, network path, or physical/environmental conditions change, the node device will be able to use the diversity of SR or LR mode neighbors to optimize the performance of its connectivity to the network or to drive application-specific mode control.

FIG. 12B illustrates an example where a node that may have previously had limited SR mode connectivity through a single neighbor or set of neighbors and where that connectivity degrades or is lost over time. Having connected to the network in SR mode, the node device will have established connectivity to a serving gateway via a parent neighbor node in SR mode. If the quality of the available neighbor connections degrades such that the available SR mode access connectivity falls below a given threshold, the node will seek to establish alternate network connectivity using the LR mode where such potential connectivity was previously identified. While previously in SR mode the node will have performed a long duration periodic low-duty-cycle repetitive scanning that allowed it to observe and store the presence of LR-mode beacons. The maintained LR-mode neighbor information is used, where applicable, to speed the search for LR-capable neighbors when a network access mode change is called for.

The process for discovery of LR-capable node neighbors is similar to the case in which a new joining node is unable to find SR neighbors for initial network connectivity and attempts to access the network by switching to a dedicated LR mode neighbor search.

In the case of joining the network for the first time, the node will not have the benefit of LR node neighbor information collected by a node that had previously been operational in SR mode. Accordingly, the node device monitors for LR mode visibility beacons, including potentially those of previously-observed LR mode neighbors. When LR-capable connected neighbors are discovered the node attempts to initiate and establish network connectivity using the LR mode. In addition to the beacon information that is broadcast, the node will use the established connection and routing information exchange to evaluate the network connectivity path offered by their neighbor nodes. As in the case of SR-mode access, the network access path selection criteria for choosing a discovered neighbor is measured primarily in terms of the data throughput for the overall path. For performance-based connectivity, as opposed to the simpler availability-based network connectivity, information on the capability of the neighbor may be used in attempting to establish a neighbor association. In a related embodiment, additional criteria may be applied, such as application requirements, for example, which can supersede the performance-based criteria in some cases.

As illustrated in FIG. 12B, where a neighbor node is selected as the parent for network access using the LR mode, the parent node will switch from the very low duty cycle LR-mode beacon broadcast to a much-higher-repetition-rate associated-neighbor beacon broadcast repetition rate. Thus, once a parent node has one or more associated-neighbor child nodes using LR-mode connectivity, the parent node communications mode control module 416 is configured to respond by providing more frequent connectivity opportunities so that information can be relayed to and from the network to service the child or children node(s) with reduced latency.

The network access and data transfer latency will be dictated by the interval of the periodic associated-neighbor LR mode beacon transmission. If neighbor nodes connect to a potential parent node but none forms an associated-neighbor relationship for network access, there is no requirement for the potential parent node to switch from the relatively infrequent discovery-mode beacon repetition rate to the relatively more frequent associated-neighbor beacon repetition rate. As a node's status changes with respect to whether it has associated-neighbor LR-mode child nodes, it automatically adapts its LR-mode associated-neighbor beacon broadcast repetition rate accordingly. In a related embodiment, the LR-mode beacon repetition rate is further adjusted based on one or more of the following factors: the number of children/descendants, how often child nodes establish communications in response to the LR-mode beacons, the volume of data being sent or received via LR mode, or application requirements.

In this example embodiment, even while a child node is associated with a given LR-mode parent, that child node will continue to monitor and utilize collected and maintained LR-mode neighbor information to establish connections to other neighbors for the purpose of exploring opportunities for better potential network access connectivity than the available connectivity through the associated parent node.

The child node will evaluate the neighbor links and their associated communication performance by scheduling connections to neighbors that may potentially offer better network access. This continued assessment of node neighbors, even if only available using LR mode, will ensure that mesh connection diversity can be maintained even when a node device is only able to connect to the network using the low-data-rate LR mode. If a neighbor is found that offers a better-performing network path, the node will switch its parent node selection to the new parent node by forming a LR-mode neighbor association with the new neighbor. If that node did not previously have associated children nodes in LR mode, it will begin the more frequent LR-mode beacon broadcasts once the new neighbor association is established. As in the case of SR mode network access, any change of gateway based on a new selected access connection will result in an explicit discovery request/response update being sent to the new serving gateway.

In the present example, each child node, even while connected to the network in LR mode, will also monitor for SR beacon transmissions. In response to these SR-mode beacons, each child node may preferentially attempt to establish connectivity to the network in that mode. In one embodiment the default decision criteria for selecting parents and communication mode will continue to be the primarily throughput-based network connectivity metric, with application-based criteria also being incorporated into the neighbor and communication mode selection decision process.

As illustrated above with reference to FIGS. 1D and 1E, regardless of its own primary mode of access connectivity to the network (LR or SR mode), a node may itself support child nodes connected in either LR or SR mode. For dual-mode nodes, the mode of its own connectivity into the network (via a parent neighbor or directly to the gateway device) does not restrict the mode supported for its children nodes to join the network. Furthermore, a node may simultaneously support both SR-mode and LR-mode children independent of the mode it uses to connect to the network.

In the dynamic adaptive, multi-hop mesh environment facilitated by aspects of the invention, nodes are able to continually assess the neighbor environment independent of the communication modes used by different neighbors. This capability ensures that the self-organizing, self-adapting nature of the network is maintained even where single and dual-mode nodes are part of the same network. Other than the time periods for transmitting its associated-neighbor beacons to service its child nodes, the time for monitoring of a LR-mode parent's beacons (where the node's connectivity is via LR mode, and the very low duty cycle background scanning for potential LR-mode neighbors, a node will spend the rest of its time operating in SR mode when not in an active service or data transfer connection. While in that idle receive mode the node will be available and able to communicate with SR-mode, non-primary (non-parent, non-child) neighbor nodes.

One aspect of the invention embodied in this example is the node's ability to coordinate and time-multiplex its dual-mode operation. Accordingly, each node device appears, as much as possible, continuously available to either or both SR-mode and associated LR-mode neighbors with minimal network access latency. In practice, embodiments of the invention can achieve an average latency on the order of sub-second (i.e., no more than 100 s of milliseconds) initial connection establishment opportunity.

In one type of embodiment, a nested time frame structure is established that allows a node device to adapt its LR mode operating capacity according to application requirements that it supports or the network connectivity that is available. The frame structure can be variably operated at a duty cycle of less than $1\times10^{-4}$ up to 100%. In one such approach, the LR mode cycle is individually adjustable for each node device and allows each node to control the degree of multiplexing supported between SR and LR modes according to its neighbor associations and supported application requirements. The duty cycle and frame structure are both defined by a single control parameter, FP. The communications channel can thus be dynamically adjusted to monitor/provide beacon synchronization for associated neighbors and to meet the other communications requirements for control, messaging, or connection-oriented two-way data communications exchanges.

FIG. 13 is a table illustrating sets of predefined communications parameters and values that are defined based on selected channel bandwidth and spreading factor, according to one embodiment of LR mode. The bandwidth and spreading factor may be predefined for the system according to expectations of the deployment environment or according to specific service applications and the data rates/connectivity range desired. In one example embodiment, a node device is pre-configured to know what the defined bandwidth (BW) and spreading factors are for the system as part of its factory firmware configuration. In a related embodiment, as part of the self-organizing and self-configuring network, the node devices each applies a search routine to determine the bandwidth and spreading factors that are in use. For example, the device can start with a 125 kHz BW assumption and search by applying a given set of spreading factors and searching the frequency spectrum for valid communications, e.g., beacons. If signals are not found after dwelling on the available frequencies for given intervals of time, the spreading factor is changed and the search repeated across the operating spectrum. If no beacons are found at the 125 kHz BW the process of searching is repeated at 250 kHz BW and, as needed, at 500 kHz. This search process can be conducted as part of the device's initial deployment when it is not yet part of the network and is thus able to devote all of its time to discovery of the BW and spreading factors defined for the network. The data rates listed in the table of FIG. 13 are a function of the bandwidth and spreading factor selections. The values in the additional link margin column represent the improvement in reception sensitivity provided by the LR DSSS communications mode (relative to that of the SR FHSS mode). The values for slot size and burst length relate to the duration and data size, respectively, for various fields available in a defined messaging frame according to one embodiment.

Figure 14A:
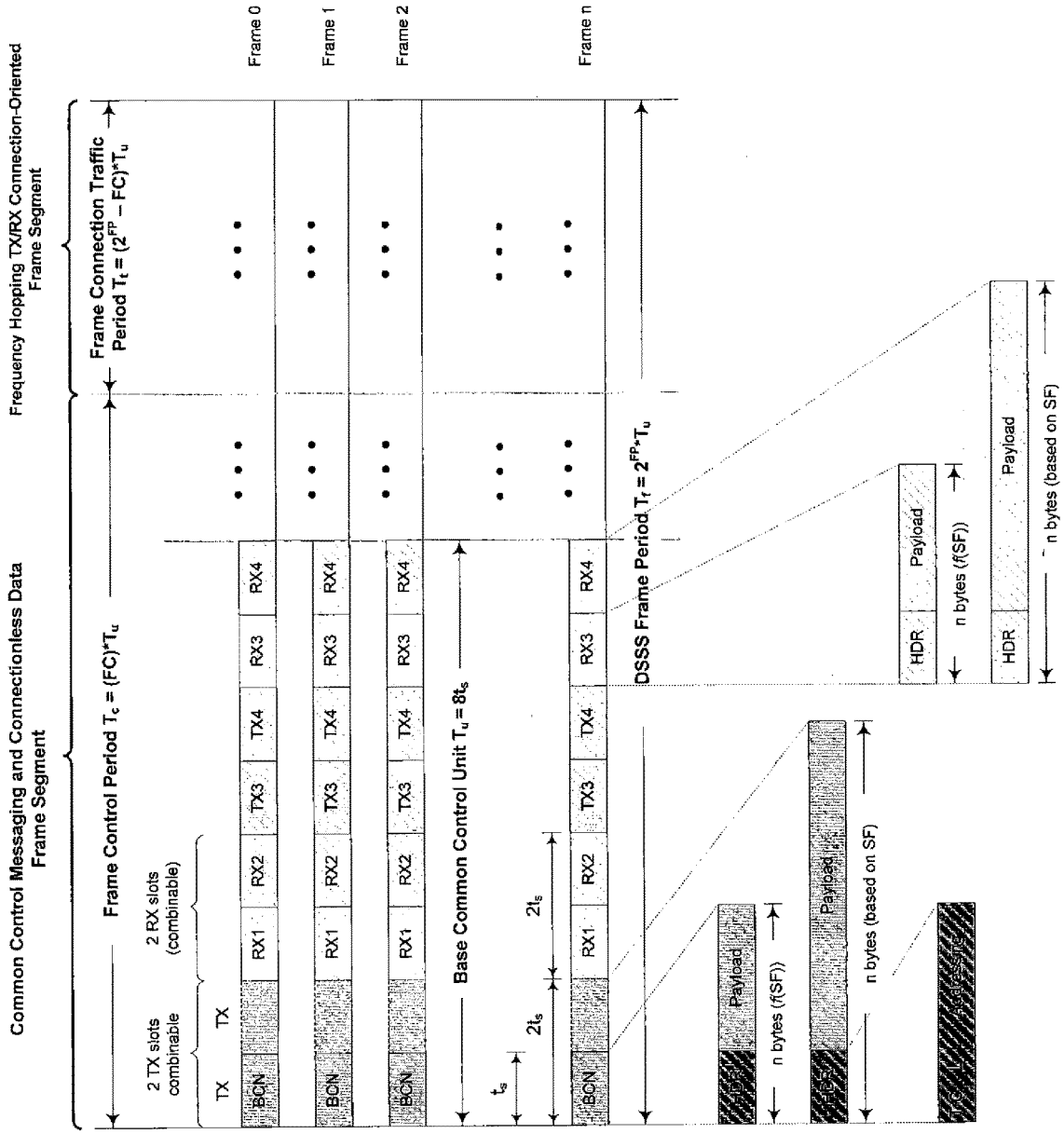
FIGS. 14A-14C illustrate exemplary control and message frame formats to be used with a long-range communication mode according to embodiments of the invention.
Figure 14B:
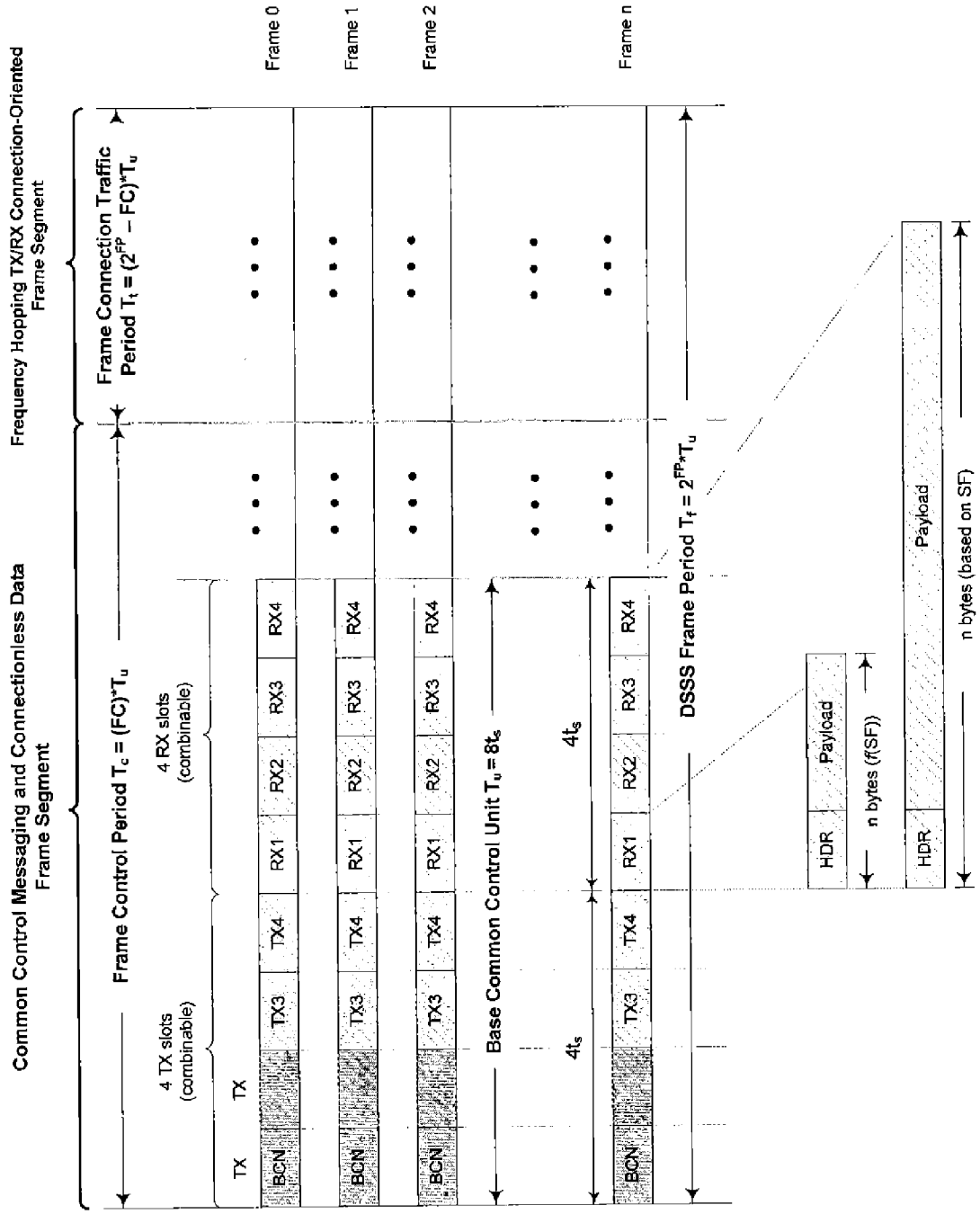
Figure 14C:
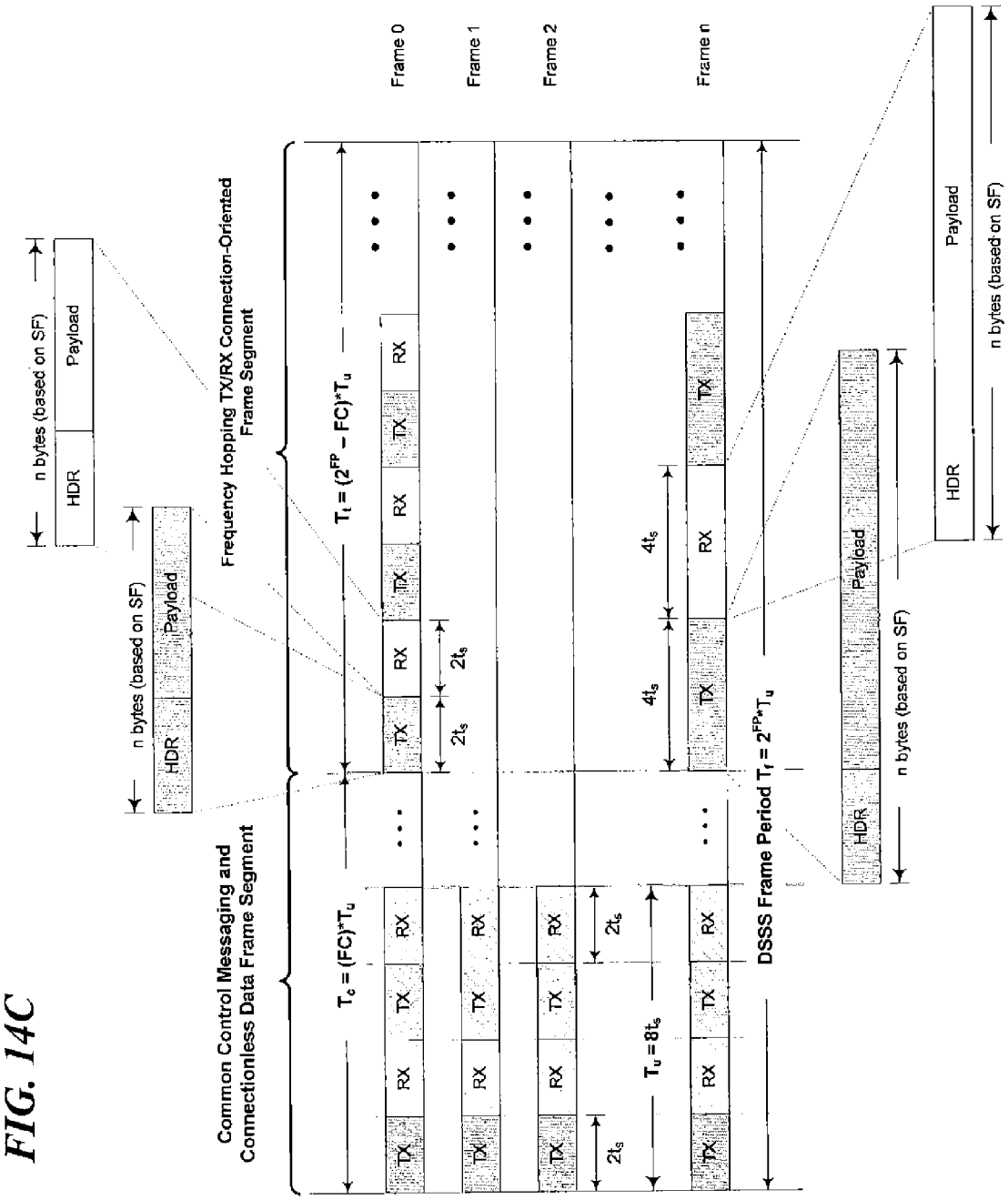

FIGS. 14A-14C illustrate an exemplary frame structure for LR-mode frames according to one embodiment. This frame scales uniformly with the channel bandwidth BW and spreading factor SF used for communications on a given link. The limited, selected set of transmission frame sizes allows upper-layer application and network control messages to be transported with within a frame structure where transmission slots sizes are directly selectable as a function of BW and SF while keeping transmission overheads low.

As depicted, each frame is composed of two segments: a common control and messaging frame segment, and a TX/RX communications frame segment where frequency hopping may be applied for dedicated connection-oriented exchanges. In one particular type of embodiment, the common control and messaging frame segment is sent on a predefined control channel, whereas the frequency hoping TX/RX communications frame segment, as its name implies, is transmitted according to a predefined frequency hopping sequence such that this segment, for consecutive transmission/reception slots, occurs on different, pseudo-randomly selected frequencies.

Each frame is composed of slots having a defined size, $t_s$, according to the bandwidth (BW) and spreading factor (SF) as follows:

$$t_s = 5 \text{ ms} \cdot \frac{500 \text{ kHz}}{BW} \cdot 2^{(SF-6)} \qquad (1)$$

Each burst sent within a transmission slot is structured with a defined set of fields, which can include a header field HDR, that is comprised of Message Type (T) and Control (C) sub-field, an optional Length (L) field, and an optional Addressing fields, and a variable length message payload. The control sub-field may also specify information on the application of data security within the transmitted burst. According to one aspect of the invention, the slots can be combined in pairwise fashion to provide an increased payload that adds multiple slot sizes of payload space (i.e., removing the overhead of the HDR fields from the additional slots) to increase the message data payload.

The common control and messaging frame segment includes one or two beacon/synchronization (BCN) transmission slots, followed by four receive mode slots during which responsive data can be received. This is followed by one or two transmission slots in which an acknowledgements or single-slot data messages can be sent. In the embodiment depicted, the common control message frame has a defined cycle duration that is given by:

$$T_c = n \cdot t_s \text{ where for example, } n=8 \qquad (2)$$

The transmission frame period is given by:

$$T_f = 2^{FP} \cdot T_c \qquad (3)$$

The frame parameter FP can be transmitted within the common control channel beacon/synchronization (BCN) field. As described above, the FP parameter allows a variable operating duty cycle to be efficiently communicated by each node device according to its network connectivity and services supported. Neighboring nodes that receive a frame from a given node device are thus able to formulaically derive the value of various communication parameters that are being used by the node device's LR communication mode as follows:

$$\text{Control Channel Duty Cycle} = \frac{100\%}{2^{FP}} \qquad (4)$$

$$\text{Device Control Channel } TX \text{ Duty Cycle} = \frac{100\%}{2^{FP+1}} \qquad (5)$$

$$TX/RX \text{ Communication Channel Capacity Allocation} = \frac{100\% \cdot c^{FP-1}}{2^{FP}} \qquad (6)$$

With the single control Variable, FP, a node device can define its LR-mode operating duty cycle from less than $1\times10^{-4}$ to 100%.

FIG. 14C illustrates the frequency hopping TX/RX communications frame segment in greater detail. This segment has alternating receive and transmission slots, each having a slot size of $2t_s$. Optionally, as shown, consecutive slots can be combined to increase the payload size, with a total combined slot size of $4t_s$. The alternating receive and transmission arrangement supports connection-oriented two-way data transfers.

In a related embodiment, node devices employ a distributed frequency channel selection scheme where each node autonomously and randomly selects its LR-mode control channel frequency, rather than using a fixed predefined control channel frequency. According to this embodiment, the channel selection and beacon transmission operation is defined to overlay and operate within the frequency channelization scheme that is defined for the SR-mode communications. This approach allows the LR-mode operation to also include frequency hopping for dedicated connections to minimize the interference impact on both SR mode and other LR-mode communications in the shared communications spectrum's neighborhood.

The embodiments above are intended to be illustrative and not limiting. Other variations are contemplated to fall within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A node device for use with a self-organizing wireless multihop network containing a plurality of other node devices and at least one gateway device, each node device being within wireless communication range of one or more neighboring node devices located in a corresponding local neighborhood, the node device comprising:
    radio communications circuitry configured to both communicate to an upstream node via short-range (SR) communication mode or a long-range (LR) communication mode, and to communicate to a downstream node in either the SR communication mode or the LR communication mode;
    a controller including a processor and a non-transitory data storage medium containing instructions executable on the processor, wherein the controller is interfaced with the radio communication circuitry;
    a communication mode control module configured to cause the radio communications circuitry to selectively operate in the SR communication mode or the LR communication mode based upon instructions from the controller, wherein the SR communication mode utilizes a higher data rate than the LR communication mode for any given communication bandwidth;
    the communication mode control module controlling operation of the radio communications circuitry to (a) advertise connectivity link availability for neighboring node devices in both the SR communication mode and the LR communication mode, according to a periodicity that is dynamically-variable in response to prevailing circumstances in the local neighborhood and how many downstream nodes are connected in the LR communication mode, and (b) selectively initiate a link in response to connectivity availability advertised by at least one neighboring node device;
    the communication mode control module controlling operation of (b) to be selectively performed in one of either the SR communication mode or the LR communication mode, based on selection criteria that include data throughput performance associated with different neighboring node devices with which connectivity is available via a corresponding one of either or both of the SR communication mode and the LR communication mode.

2. The node device of claim 1, wherein the LR communication mode utilizes direct sequence spread spectrum (DSSS) communications, and the SR communications mode utilizes frequency hopping spread spectrum (FHSS) communications.

3. The node device of claim 1, wherein the LR communication mode utilizes direct sequence spread spectrum (DSSS) communications together with frequency hopping operation applied.

4. The node device of claim 1, wherein the wireless multihop network is arranged in a hierarchy of parent and child nodes in which node devices operating as parent nodes provide links for one or more child nodes through which connectivity to a gateway device is established, and wherein the communication mode control module operates the node device to time-multiplex operations as a parent node and as a child node, wherein the operation of (a) is carried out as part of the parent node operations and the operation of (b) is carried out as part of the child node operation.

5. The node device of claim 4, wherein the operation of (a) is performed in one of either the SR mode or the LR mode in response to a parent mode selection, and wherein the operation of (b) is performed in one of either the SR mode or the LR mode in response to a child mode selection; and
    wherein the parent mode selection is made independently of the child mode selection.

6. The node device of claim 4, wherein the operation of (a) is performed in one of either the SR mode or the LR mode in response to a parent mode selection, and wherein the operation of (b) is performed in one of either the SR mode or the LR mode in response to a child mode selection; and
    wherein the child mode selection is made independently of the parent mode selection.

7. The node device of claim 1, wherein in the operation of (a), the communication mode control module causes the radio communication circuitry to transmit SR communication mode beacons and LR communication mode beacons at variably-configured intervals, each of the beacons serving to advertise the availability; and wherein each of the LR communication mode beacons is followed by at least one receive slot in which the communication mode control module causes the radio communication circuitry to listen for incoming communications responsive to the preceding beacon.

8. The node device of claim 7, wherein in the operation of (a), the communication mode control module adjusts a ratio of operation between the SR and the LR communication modes.

9. The node device of claim 7, wherein in the operation of (a), the communication mode control module varies the interval of LR communication mode beacons and SR communication mode beacons independently of one another.

10. The node device of claim 7, wherein the LR communication mode beacons are included in a frame structure comprising transmission and receive slots having a finite set of variably-configurable slot sizes defined based on a selected combination of channel bandwidth and spreading factor of direct sequence spread spectrum (DSSS) communications selected from finite sets of channel bandwidths and spreading factors, respectively, that are available for the LR communication mode.

11. The node device of claim 7, wherein the variably-configured intervals of the LR communication mode beacons are formulaically derived from a dynamically-variable frame parameter, wherein the communication mode control module selects a value for the frame parameter, and wherein each of the LR communication mode beacons includes the value of the frame parameter.

12. The node device of claim 7, wherein the LR communication mode beacons are included in a frame structure comprising transmission and receive slots in which frame segments, each containing a header portion and a payload portion, are transmitted and received respectively, and wherein certain consecutive frame segments are combinable into a single extended frame segment having a single header portion and an extended payload portion that is greater than two payload portions of a pair of un-combined consecutive frame segments.

13. The node device of claim 1, wherein in the operation of (a), the prevailing circumstances to which the dynamically-variable scheduling is responsive include a determination of whether any neighboring node device has established a neighbor-associated connection to the node device in a corresponding communication mode, wherein in response to an absence of connections with neighboring node devices in the LR communication mode, the dynamically-variable scheduling of connectivity advertising in the LR communication mode is set to a predefined minimum advertisement repetition rate.

14. The node device of claim 13, wherein in response to addition of neighboring node devices connecting to the node device in the LR communication mode, the dynamically-variable scheduling of connectivity advertising in the LR communication mode adjusted to increase an advertisement repetition rate.

15. The node device of claim 1, wherein in the operation of (b), the communication mode control module causes the radio communication circuitry to listen for incoming communications containing a beacon and, in response to a reception of the beacon, to transmit a connection request message that initiates the link.

16. The node device of claim 1, wherein in the operation of (b), the selection criteria further includes application requirements for the communication mode.

17. The node device of claim 1, wherein the communication mode control module includes:

a new discovery beacon module configured to control the radio communications circuitry to send LR communication mode connectivity link availability beacons at a first repetition rate; and a associated-neighbor module configured to control the radio communications circuitry to send LR communication mode connectivity link availability beacons at a second repetition rate that exceeds the first repetition rate; and a scheduling module that dynamically varies at least the second repetition rate based on the prevailing circumstances, wherein the prevailing circumstances include a quantity of neighboring node devices responsive to the LR communication mode connectivity link availability beacons.

18. The node device of claim 17, wherein the communication mode control module is configured to cause the radio communications circuitry to:

send the LR communication mode connectivity link beacons at the first repetition rate on a dedicated control channel frequency defined from among a set of possible control channel frequencies; and send the LR communication mode connectivity link beacons at the second repetition rate on the dedicated control channel frequency while conducting communications on a plurality of other channel frequencies according to a defined frequency hopping sequence for an communications connection with an established neighbor node device.

19. In a self-organizing wireless multihop network containing a plurality of node devices and at least one gateway device, each node device being within wireless communication range of one or more neighboring node devices located in a corresponding local neighborhood, a method for operating a node device, the method comprising:

(a) selectively performing communications both upstream and downstream in both a short-range (SR) communication mode, and in a long-range (LR) communication mode, wherein the SR communication mode utilizes a higher data rate than the LR communication mode for any given communication bandwidth;

(b) advertising connectivity link availability in both the SR communication mode and the LR communication mode for neighboring node devices; and (c) selectively initiating a link in response to connectivity availability advertised by at least one neighboring node device;

wherein (b) is performed in both, the SR communication mode, and the LR communication mode, according to a periodicity that is dynamically-variable in response to prevailing circumstances in the local neighborhood and how many downstream devices are connected in the LR communication mode;

wherein (c) is selectively performed in one of either the SR communication mode or the LR communication mode, based on selection criteria that include data throughput performance associated with different neighboring node devices with which connectivity is available via a corresponding one of either or both of the SR communication mode and the LR communication mode.

20. The method of claim 19, wherein the LR communication mode utilizes direct sequence spread spectrum (DSSS) communications, and the SR communications mode utilizes frequency hopping spread spectrum (FHSS) communications.

21. The method of claim 19, wherein the LR communication mode utilizes direct sequence spread spectrum (DSSS) communications together with frequency hopping operation applied.

22. The method of claim 19, wherein the wireless multi-hop network is arranged in a hierarchy of parent and child nodes in which node devices operating as parent nodes provide links for one or more child nodes through which connectivity to a gateway device is established, and wherein the operations of (a)-(c) are time-multiplexed as parent node and as a child node operations, wherein the operation of (b) is carried out as part of the parent node operations and the operation of (c) is carried out as part of the child node operation.

23. The method of claim 22, wherein the operation of (b) is performed in one of either the SR mode or the LR mode in response to a parent mode selection, and wherein the operation of (c) is performed in either the SR mode or the LR mode in response to a child mode selection; and
wherein the parent mode selection is made independently of the child mode selection.

24. The method of claim 22, wherein the operation of (b) is performed in one of either the SR mode or the LR mode in response to a parent mode selection, and wherein the operation of (c) is performed in one of either the SR mode or the LR mode in response to a child mode selection; and
wherein the child mode selection is made independently of the parent mode selection.

25. The method of claim 19, wherein in the operation of (b), SR communication mode beacons and LR communication mode beacons are transmitted at variably-configured intervals, each of the beacons serving to advertise the availability; and
wherein each of the LR communication mode beacons is followed by at least one receive slot in which the method further includes listening for incoming communications responsive to the preceding beacon.

26. The method of claim 25, wherein in the operation of (b), a ratio of operation between the SR and the LR communication modes is autonomously adjusted by each node.

27. The method of claim 25, wherein in the operation of (b), the interval of LR communication mode beacons and SR communication mode beacons is varied independently of one another.

28. The method of claim 25, wherein the LR communication mode beacons are included in a frame structure comprising transmission and receive slots having a finite set of variably-configurable slot sizes defined based on a selected combination of channel bandwidth and spreading factor of direct sequence spread spectrum (DSSS) communications selected from finite sets of channel bandwidths and spreading factors, respectively, that are available for the LR communication mode.

29. The method of claim 25, wherein the variably-configured intervals of the LR communication mode beacons are formulaically derived from a dynamically-variable frame parameter, wherein a value for the frame parameter is selected, and wherein each of the LR communication mode beacons includes the value of the frame parameter.

30. The method of claim 25, wherein the LR communication mode beacons are included in a frame structure comprising transmission and receive slots in which frame segments, each containing a header portion and a payload portion, are transmitted and received respectively, and wherein certain consecutive frame segments are combinable into a single extended frame segment having a single header portion and an extended payload portion that is greater than two payload portions of a pair of un-combined consecutive frame segments.

31. The method of claim 19, wherein in the operation of (b), the prevailing circumstances to which the dynamically-variable scheduling is responsive include a determination of whether any neighboring node device has established a neighbor-associated connection to the node device in a corresponding communication mode, wherein in response to an absence of connections with neighboring node devices in the LR communication mode, the dynamically-variable scheduling of connectivity advertising in the LR communication mode is set to a predefined minimum advertisement repetition rate.

32. The method of claim 31, wherein in response to addition of neighboring node devices connecting to the node device in the LR communication mode, the dynamically-variable scheduling of connectivity advertising in the LR communication mode is adjusted to increase an advertisement repetition rate.

33. The method of claim 19, wherein in the operation of (c), the method further includes listening for incoming communications containing a beacon and, in response to a reception of the beacon, transmitting a connection request message that initiates the link.

34. The method of claim 19, wherein in the operation of (c), the selection criteria further includes application requirements for the communication mode.

35. The method of claim 19, further comprising:
sending the LR communication mode connectivity link availability beacons at a first repetition rate; and
sending the LR communication mode connectivity link availability beacons at a second repetition rate that exceeds the first repetition rate; and
dynamically varying at least the second repetition rate based on the prevailing circumstances, wherein the prevailing circumstances include a quantity of neighboring node devices responsive to the LR communication mode connectivity link availability beacons.

36. The method of claim 35, further comprising:
sending the LR communication mode connectivity link beacons at the first repetition rate on a dedicated control channel frequency defined from among a set of possible control channel frequencies; and
sending the LR communication mode connectivity link beacons at the second repetition rate on the dedicated control channel frequency while conducting communications on a plurality of other channel frequencies according to a defined frequency hopping sequence for an communications connection with an established neighbor node device.

37. In a self-organizing wireless multihop network containing a plurality of node devices and at least one gateway device, each node device being within wireless communication range of one or more neighboring node devices located in a corresponding local neighborhood, a node device, comprising:
means for performing communications both to an upstream node in a short-range (SR) communication mode or a long-range (LR) communication mode, and for performing communications to a downstream node via the SR communication mode or the LR communication mode, wherein the SR communication mode utilizes a higher data rate than the LR communication mode for any given communication bandwidth;

means for advertising connectivity link availability for neighboring node devices in both the SR communication mode and the LR communication mode; and means for selectively initiating a link in response to connectivity availability advertised by at least one neighboring node device;

wherein the means for advertising connectivity link availability advertises said availability in both, the SR communication mode, and the LR communication mode, according to a periodicity that is dynamically-variable in response to prevailing circumstances in the local neighborhood and how many downstream devices are connected in the LR communication mode; and wherein the means for selectively initiating a link in response to connectivity availability performs the selective initiating in one of either the SR communication mode or the LR communication mode, based on selection criteria that include data throughput performance associated with different neighboring node devices with which connectivity is available via a corresponding one of either or both of the SR communication mode and the LR communication mode.

* * * * *